United States Patent
Klinger et al.

(10) Patent No.: US 10,214,038 B2
(45) Date of Patent: Feb. 26, 2019

(54) PRINTING SYSTEM AND METHOD

(71) Applicant: LANDA CORPORATION LTD., Rehovot (IL)

(72) Inventors: Shahar Klinger, Rehovot (IL); David Tal, Rehovot (IL); Alon Siman-Tov, Or Yehuda (IL)

(73) Assignee: LANDA CORPORATION LTD., Rehovot ( * ) Notice: Subject to any disclaimer, the term of this patent is extended or adjusted under 35 U.S.C. 154(b) by 0 days.

(21) Appl. No.: 15/541,478

(22) PCT Filed: Jan. 14, 2016

(86) PCT No.: PCT/IB2016/050170
§ 371 (c)(1),
(2) Date: Jul. 4, 2017

(87) PCT Pub. No.: WO2016/113698
PCT Pub. Date: Jul. 21, 2016

(65) Prior Publication Data
US 2018/0022131 A1   Jan. 25, 2018

(30) Foreign Application Priority Data
Jan. 15, 2015 (GB) .................................. 1500683.6

(51) Int. Cl.
*B41J 29/393* (2006.01)
*H04N 1/401* (2006.01)
(Continued)

(52) U.S. Cl.
CPC .......... *B41J 29/393* (2013.01); *G06T 7/0004* (2013.01); *H04N 1/4015* (2013.01); *H04N 1/6041* (2013.01); *G06T 2207/30144* (2013.01)

(58) Field of Classification Search
CPC ...... B41J 2/2135; B41J 2/2146; B41J 29/393; H04N 1/6033; H04N 1/1903
See application file for complete search history.

(56) References Cited

U.S. PATENT DOCUMENTS 6,390,583 B1  5/2002  Kato et al.
6,755,496 B2  6/2004  Nishikori et al.
(Continued)

FOREIGN PATENT DOCUMENTS

GB   2534186 A       7/2016
JP   2009/137251 A   6/2009
(Continued)

OTHER PUBLICATIONS

JP 2011/164622 Machine Translation (by EPO and Google)—published Aug. 25, 2011; Toshiba.
(Continued)

*Primary Examiner* — Sharon A Polk
(74) *Attorney, Agent, or Firm* — Marc Van Dyke; Fourth Dimension IP

(57) ABSTRACT

Some embodiments relate to a digital printing system and method for depositing ink droplets onto a target surface in dependence upon a received electrical printing signal containing data indicating the desired image to be printed while improving the uniformity of intended tone reproduction of the printed image.

6 Claims, 24 Drawing Sheets

During Calibration

(51) Int. Cl.
*H04N 1/60* (2006.01)
*G06T 7/00* (2017.01)

(56) References Cited

U.S. PATENT DOCUMENTS

| | | | |
|---|---|---|---|
| 6,819,352 B2 | 11/2004 | Mizes et al. |
| 6,832,824 B1 | 12/2004 | Baker et al. |
| 6,851,785 B2 | 2/2005 | Wu et al. |
| 7,023,584 B2 | 4/2006 | Cowan et al. |
| 7,085,002 B2 | 8/2006 | Ilbery et al. |
| 7,120,369 B2 | 10/2006 | Hamby et al. |
| 7,277,196 B2 | 10/2007 | Van de Capelle et al. |
| 7,319,545 B2 | 1/2008 | Linder et al. |
| 7,375,740 B2 | 5/2008 | Mizes |
| 7,380,898 B2 | 6/2008 | Plante et al. |
| 7,486,416 B2 | 2/2009 | Dalal et al. |
| 7,515,305 B2 | 4/2009 | Mizes |
| 7,538,909 B2 | 5/2009 | Ilbery et al. |
| 7,542,171 B2 | 6/2009 | Viassolo et al. |
| 7,565,026 B2 | 7/2009 | Schweid |
| 7,571,974 B2 | 8/2009 | Cowan et al. |
| 7,591,521 B2 | 9/2009 | Aruga |
| 7,602,529 B2 | 10/2009 | Foster et al. |
| 7,639,399 B2 | 12/2009 | Ikeda |
| 7,673,958 B2 | 3/2010 | Heiles et al. |
| 7,864,364 B2 | 1/2011 | Zhang et al. |
| 7,936,479 B2 | 5/2011 | Bracke et al. |
| 7,948,666 B2 | 5/2011 | Yoshida et al. |
| 7,965,419 B2 | 6/2011 | Kakutani |
| 8,023,145 B2 | 9/2011 | Maki et al. |
| 8,136,910 B2 | 3/2012 | Batalla et al. |
| 8,305,660 B2 | 11/2012 | Zhang et al. |
| 8,379,271 B2 | 2/2013 | Kakutani |
| 8,559,061 B2 | 10/2013 | Kuo et al. |
| 8,643,920 B2 | 2/2014 | Campbell et al. |
| 8,654,402 B2 | 2/2014 | Mestha et al. |
| 8,705,120 B2 | 4/2014 | Zhang et al. |
| 8,743,396 B2 | 6/2014 | Bastani et al. |
| 8,922,838 B2 | 12/2014 | Fernandez del Rio et al. |
| 9,010,893 B1 | 4/2015 | Mizes et al. |
| 2003/0071866 A1 | 4/2003 | Wong et al. |
| 2004/0114164 A1 | 6/2004 | Linder et al. |
| 2009/0135449 A1* | 5/2009 | Watanabe ............ H04N 1/4078 358/3.01 |
| 2009/0296156 A1 | 12/2009 | Mestha et al. |
| 2012/0081443 A1 | 4/2012 | Ono et al. |
| 2014/0085369 A1 | 3/2014 | Allworth et al. |

FOREIGN PATENT DOCUMENTS

| | | |
|---|---|---|
| JP | 2011/164622 A | 8/2011 |
| WO | 2013/122339 A1 | 9/2013 |
| WO | 2013/132340 A1 | 9/2013 |
| WO | 2013/132343 A1 | 9/2013 |
| WO | 2013/132345 A1 | 9/2013 |
| WO | 2013/132424 A | 9/2013 |
| WO | 2013/132432 A | 9/2013 |
| WO | 2013/132438 A2 | 9/2013 |
| WO | 2013/132439 A | 9/2013 |
| WO | 2013/136220 A | 9/2013 |

OTHER PUBLICATIONS

JP 2009/137251 Machine Translation (by Google Patents)—published Jun. 25, 2009; Seiko Epson Corp.
Search Report for PCT/IB2016/050170 dated Apr. 19, 2016.
Written Opinion for PCT/IB2016/050170 dated Apr. 19, 2016.
Search and Examination Report GB 2534186 dated Jul. 16, 2015.

\* cited by examiner

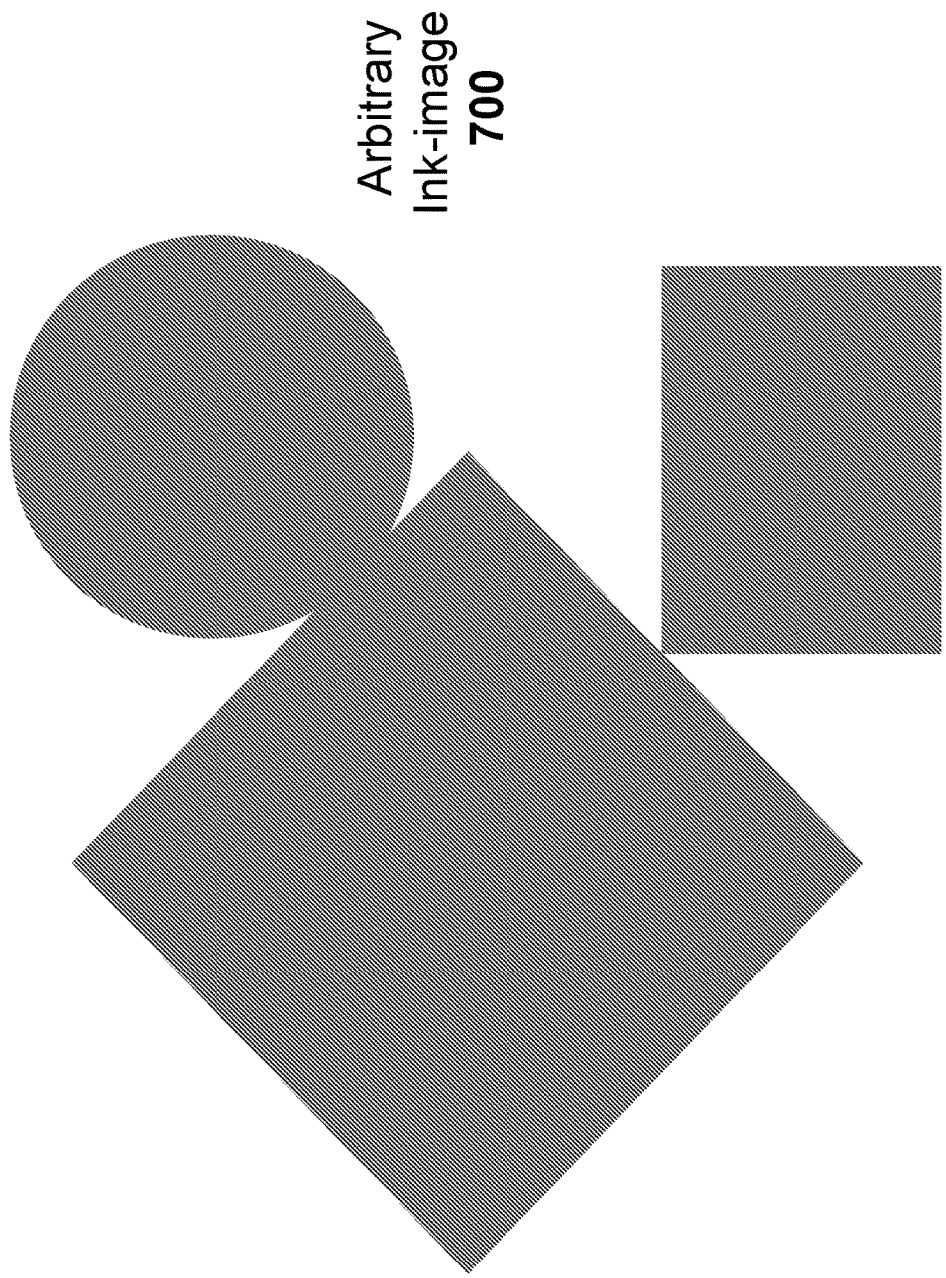

Example of implementation of S141

PRINTING SYSTEM AND METHOD

FIELD OF THE INVENTION

The present invention relates to systems and methods for printing ink images—for example, in a manner that compensates image non-uniformity effects.

BACKGROUND OF THE INVENTION

The following issued patents and patent publications provide potentially relevant background material, and are all incorporated by reference in their entirety: U.S. Pat. No. 6,819,352, U.S. Pat. No. 7,565,026, U.S. Pat. No. 7,375,740, U.S. Pat. No. 7,542,171, U.S. Pat. No. 7,120,369, US 2014/085369, US 2003/071866 and JP 2011164622.

SUMMARY OF EMBODIMENTS OF THE INVENTION

Some embodiments relate to a digital printing system and method for depositing ink droplets onto a target surface in dependence upon a received electrical printing signal containing data indicating the desired image to be printed while improving the uniformity of intended tone reproduction of the printed image. The printing system comprises a multi-nozzle and multi-head print bar that defines print and cross-print directions, an image scanner for scanning a calibration image printed by the print bar, and a computing system operative during a calibration phase to analyze the output of the image scanner generated by scanning a calibration image, calibration image data from the scanner being analyzed slice by slice to develop a respective image-correction-function $f$ or each slice of the scanned calibration image, and to apply, during a print run, the image-correction function computed during the calibration phase to the received printing signal, on a slice by slice basis, in order to reduce errors between the desired image and the image printed by the print bar.

Embodiments of the present invention relate to methods and systems for correcting image non-uniformity in printing systems where ink images are formed on a target surface by deposition of liquid ink droplets. The target surface may be a printing substrate (e.g., paper, cardboard, plastic, fabric, etc.) or an intermediate transfer member (ITM).

In the latter case, ink images may be formed upon the ITM as part of an indirect printing process where droplets of liquid inks are deposited on the outer surface of the ITM, modified thereon (e.g., chemically or physically treated, evaporated, dried, etc.) and transferred therefrom to a printing substrate. As noted in the previous paragraph, it is understood that the present teachings are similarly applicable to printing systems wherein the ink is directly deposited to the printing substrate.

FIGS. 1A and 2A-2B illustrate diverse apparatus that implement an indirect printing process. In the examples of FIGS. 1A and 2A, the ITM is a blanket mounted over a plurality of rollers, so as to form a continuous belt, while in the example of FIG. 2B the ITM is a rigid drum (or a blanket mounted thereupon). The apparatus of FIGS. 1A and 2A-2B all comprise an image forming system 300 including one or more print bars 302—in the non-limiting examples of FIGS. 1A and 2A-2B each print bar deposits ink droplets of a different respective color (e.g., cyan, magenta, yellow and key (black)). In all of FIGS. 1A and 2A-2B, the outer surface of the ITM is in relative motion along a 'printing direction' relative to print bars 302. In FIGS. 1A and 2A a relatively flat portion of the ITM moves in the 'y' direction. In FIG. 2B, the ITM rotates in the θ direction.

One salient feature of all digital printing systems is the conversion of digital "input" images stored electronically (e.g., in computer memory) into ink-images. FIG. 1B illustrates operation of a printing system (i.e. implementing either an indirect printing process or a direct printing process). In FIG. 1B, a digital input image (e.g., an array of pixels) stored in volatile or non-volatile computer memory or in other suitable storage is printed, yielding an ink-image.

When the digital input image resides in computer memory (or other computer-readable storage), each position in the array of pixels has a different 'input density value' (e.g., a tone value) describing the density of color to be printed. In addition, it is possible to characterize the ink image according to the local color output-density value (or simply 'output density value') at a plurality of physical locations on a two-dimensional grid which overlays the ink image. The orthogonal directions of the grid may correspond to the 'print direction' and the 'cross-print' direction.

One example of an 'input density value' is a tone value. One example of an 'output density value' is a luminance—however, it is possible to work with any input or output color space including but not limited to the RGB space, the CMYK space and the XYZ space. Preferably, the input is in CMYK space. Certain embodiments are discussed below for the specific case where the input density value is a 'tone value' and the output density value is a 'luminance.' It is appreciated that this is a specific case and is not intended as limiting—any input density value (e.g., in CMYK space) and any output density value may be substituted for 'tone value' and 'luminance.'

The discussion below relates to 'tone reproduction functions.' The term 'tone reproduction function' (trf) describes a dependence (i.e. according to the physical and/or chemical parameters of the printing system or the printing process or setup/apparatus) of output density values upon input density values for a plurality of different input density values. One example of an input density value is tone value; one example of an output density value is luminance. However, the trf is not limited to this specific case and can relate to any 'input density value' and 'output density value.'

Additional details about the specific apparatus of FIGS. 1A and 2A-2B is discussed below in the section entitled "Additional Discussion About FIGS. 1A and 2A-2B."

In all cases, the print bar 302 is disposed along an axis perpendicular to the printing direction, referred to as the 'cross-print direction.' In FIGS. 1A and 2A-2B the cross-print direction is along the x-axis (not shown).

As illustrated in FIG. 3, the print bar 302, schematically illustrated from bottom view and "side" view, comprises an array of one or more print heads 600 (preferably, a plurality of print heads 600). FIG. 3 illustrates four such print heads 600A-600D. Within each print head 600 are a plurality of nozzles via which liquid ink is deposited, as droplets, on the target surface. FIG. 4, discussed below, illustrates a single print head 600.

In theory, given the same instruction to deposit the same ink volume, each nozzle should behave like every other nozzle with respect to deposition of such purportedly identical ink droplets. In practice, different nozzles may behave differently even in response to an instruction to deposit a monotone uniform image, leading the non-uniformities in the ink image formed on the target surface, even in situations where it is desired to generate a uniform (i.e. uniform in the cross-print direction) ink image (or portion thereof) of a single tone. Alternatively or additionally, other factor(s)

(e.g., a cross-print-direction-temperature gradient on the target surface, or any other factor) may cause or contribute to image non-uniformity in situations where it is desired to print an image that is uniform in the cross-print direction. It is understood that any image having non-constant tone value or luminance is non-uniform. For the present disclosure, the term 'image non-uniformity' refers to non-uniform luminance observable in a section of an ink-image where the input digital image has a uniform tone value.

A method of digital printing by a printing system that (i) comprises a multi-nozzle and multi-head print bar that defines print and cross-print directions and (ii) is configured to convert digital input images into ink images by droplet deposition onto a target surface is disclosed. The method comprises: a. performing a calibration by: i. printing on the target surface a digital input-calibration-image DICI by the print-bar of the printing system so as to generate an ink calibration-image; ii. optically imaging the ink calibration-image to obtain a digital output-calibration-image DOCI; iii. computing from the digital output-calibration-image DOCI a representative print-bar tone-reproduction-function trf (bar) for the entire print bar; iv. for each slice $slice_i(DOCI)$ of a plurality $\{slice_1(DOCI), slice_2(DOCI) \ldots slice_N(DOCI)\}$ of slices of the digital output-calibration-image DOCI, computing a respective slice-specific tone-reproduction-function $trf(slice_i(DOCI))$; and v. deriving a print-bar-spanning image-correction-function ICF (cross-print-direction-location, tone-value) from the slice-specific and/or print-bar tone reproduction function(s); b. applying the image-correction-function ICF to a uncorrected digital image UDI so as to compute a corrected digital image CDI; and c. printing the corrected digital image CDI by the printing system, wherein A. the printing system is configured so that images produced by the print-bar thereof are dividable into alternating single-print-head slices and interlace slices; B. within the single-print-head slices, the ICF is derived primarily from region-internal DOCI data; and iii. within the interlace slices, the ICF is derived primarily from extrapolation of region external DOCI data.

A method of digital printing by a printing system that (i) comprises a multi-nozzle and multi-head print bar that defines print and cross-print directions and (ii) is configured to convert digital input images into ink images by droplet deposition onto a target surface is disclosed. The method comprises: a. performing a calibration by: i. printing on the target surface a digital input-calibration-image DICI by the print-bar of the printing system so as to generate an ink calibration-image; ii. optically imaging the ink calibration-image to obtain a digital output-calibration-image DOCI; iii. computing from the digital output-calibration-image DOCI a representative print-bar tone-reproduction-function trf (bar) for the entire print bar; iv. for each slice $slice_i(DOCI)$ of a plurality $\{slice_1(DOCI), slice_2(DOCI) \ldots slice_N(DOCI)\}$ of slices of the digital output-calibration-image DOCI, computing a respective slice-specific tone-reproduction-function $trf(slice_i(DOCI))$; and v. deriving a print-bar-spanning image-correction-function ICF (cross-print-direction-location, tone-value) from the slice-specific and/or print-bar tone reproduction function(s); b. applying the image-correction-function ICF to a uncorrected digital image UDI so as to compute a corrected digital image CDI; and c. printing the corrected digital image CDI by the printing system, wherein: A. the printing system is configured so that images produced by the print-bar thereof comprise first and second distinct single-print-head slices and a mediating slice therebetween, the first and second single-print-head slices being respectively exclusive for first and second print-heads of the multi-head print bar; B. the mediating slice includes first and second sets of positions interlaced therein, positions of the first and second set respectively corresponding to nozzle positions for nozzles of the first and second print heads; C. the deriving of the ICF includes computing first and second extrapolation functions respectively describing extrapolation from the first and second single-print-head slices into the mediating region of DOCI data, or a derivative thereof; and iv. within the mediating region, (A) at positions of the first set, the ICF is derived primarily from the first extrapolation function and (B) at positions of the second set, the ICF is derived primarily from the second extrapolation function.

A method of digital printing by a printing system that (i) comprises a multi-nozzle and multi-head print bar that defines print and cross-print directions and (ii) is configured to convert digital input images into ink images by droplet deposition onto a target surface is disclosed. The method comprises: a. performing a calibration by: i. printing on the target surface a digital input-calibration-image DICI by the print-bar of the printing system so as to generate an ink calibration-image; ii. optically imaging the ink calibration-image to obtain a digital output-calibration-image DOCI; iii. computing from the digital output-calibration-image DOCI a representative print-bar tone-reproduction-function trf (bar) for the entire print bar; iv. for each slice $slice_i(DOCI)$ of a plurality $\{slice_1(DOCI), slice_2(DOCI) \ldots slice_N(DOCI)\}$ of slices of the digital output-calibration-image DOCI, computing a respective slice-specific tone-reproduction-function $trf(slice_i(DOCI))$; and v. deriving a print-bar-spanning image-correction-function ICF (cross-print-direction-location, tone-value) from the slice-specific and/or print-bar tone reproduction function(s); b. applying the image-correction-function ICF to a uncorrected digital image UDI so as to compute a corrected digital image CDI; and c. printing the corrected digital image CDI by the printing system, wherein A. the printing system is configured so that images produced by the print-bar thereof comprise first and second of distinct single-print-head slices and a interlace slice therebetween, the first and second single-print-head slices being respectively exclusive for first and second print-heads; B. the interlace slice includes first and second sets of positions interlaced therein, positions of the first and second set respectively corresponding to nozzle positions for nozzles of the first and second print heads; and C. within the interlace region, the ICF is computed by determining if a position in the mediating region corresponds to a nozzle position of the first print-head or the second print-head, and the ICF is computed according to the results of the determining.

A method of digital printing by a printing system that (i) comprises a multi-nozzle and multi-head print bar that defines print and cross-print directions and (ii) is configured to convert digital input images into ink images by droplet deposition onto a target surface is disclosed. The method comprises: a. performing a calibration by: i. printing on the target surface a digital input-calibration-image DICI by the print-bar of the printing system so as to generate an ink calibration-image; ii. optically imaging the ink calibration-image to obtain a digital output-calibration-image DOCI; iii. computing from the digital output-calibration-image DOCI a representative print-bar tone-reproduction-function trf (bar) for the entire print bar; iv. for each slice $slice_i(DOCI)$ of a plurality $\{slice_1(DOCI), slice_2(DOCI) \ldots slice_N(DOCI)\}$ of slices of the digital output-calibration-image DOCI, computing a respective slice-specific tone-reproduction-function $trf(slice_i(DOCI))$; and v. deriving a print-barspanning image-correction-function ICF (cross-print-direction-location, tone-value) from the slice-specific and/or print-bar tone reproduction function(s); b. applying the image-correction-function ICF to a uncorrected digital image UDI so as to compute a corrected digital image CDI; and c. printing the corrected digital image CDI by the printing system, wherein: A. the printing system is configured so that images produced by the print-bar thereof comprise first and second of distinct single-print-head slices and a mediating slice therebetween, the first and second single-print-head slices being respectively exclusive for first and second print-heads; B. the mediating region includes first $P_1$ and second $P_2$ positions, the first position $P_1$ being closer to the first single-print-head slice than the second $P_2$ position is to the first single-print-head slice, the second position $P_2$ being closer to the second single-print-head slice than the first position $P_1$ is to the second single-print-head slice; C. the deriving of the ICF includes computing first and second extrapolation functions respectively describing extrapolation from the first and second single-print-head slices into the mediating region of DOCI data, or a derivative thereof; and D. when computing ICF for the first position, a greater weight is assigned to the second extrapolation function than to the first extrapolation function; and v. when computing ICF for the second position, a greater weight is assigned to the first extrapolation function than to the second extrapolation function.

In some embodiments, i. the calibration further comprises: for each of slice $slice_i(DOCI)$ of the slice plurality, applying a respective inverse of a respective slice-specific tone-reproduction-function to the representative print-bar tone-reproduction-function trf(bar) to yield a tone-shift-function-set tsfs(DOCI)= {tsf_slice$_1$(DOCI)(tone-value), tsf_slice$_2$(DOCI)(tone-value), . . . tsf_slice$_N$(DOCI)(tone-value)} of slice-specific tone-shift functions; and ii. the print-bar-spanning image-correction-function ICF (cross-print-direction-location, tone-value) is derived from the tone-shift-function-set tsfs(DOCI) of slice-specific tone-shift functions.

A method of digital printing by a printing system configured to convert digital input images into ink images by droplet deposition onto a target surface, the printing system comprising a multi-nozzle and multi-head print bar that defines print and cross-print directions is disclosed. The method comprises: a. performing a calibration by: i. printing on the target surface a digital input-calibration-image DICI by the print-bar of the printing system so as to generate an ink calibration-image; ii. optically imaging the ink calibration-image to obtain a digital output-calibration-image DOCI; iii. computing from the digital output-calibration-image DOCI a representative print-bar tone-reproduction-function trf(bar) for the entire print bar; iv. for each slice $slice_i(DOCI)$ of a plurality {slice$_1$(DOCI), slice$_2$(DOCI) . . . slice$_N$(DOCI)} of slices of the digital output-calibration-image DOCI, computing a respective slice-specific tone-reproduction-function trf(slice$_i$(DOCI)); and v. for each of slice $slice_i(DOCI)$ of the slice-plurality, applying a respective inverse of a respective slice-specific tone-reproduction-function to the representative print-bar tone-reproduction-function trf(bar) to yield a tone-shift-function-set tsfs(DOCI)= {tsf_slice$_1$(DOCI)(tone-value), tsf_slice$_2$(DOCI)(tone-value), . . . tsf_slice$_N$(DOCI)(tone-value)} of slice-specific tone-shift functions; and vi. deriving a print-bar-spanning image-correction-function ICF (cross-print-direction-location, tone-value) from the tone-shift-function-set tsfs(DOCI) of slice-specific tone-shift functions; b. applying the image-correction-function ICF to a uncorrected digital image UDI so as to compute a corrected digital image CDI; and c. printing the corrected digital image CDI by the printing system.

In some embodiments, i. the printing system is configured so that images produced by the print-bar thereof are dividable into alternating single-print-head slices and interlace slices; ii. within the single-print-head slices, the ICF is derived primarily from region-internal DOCI data; and iii. within the interlace slices, the ICF is derived primarily from extrapolation of region external DOCI data.

In some embodiments, i. the printing system is configured so that images produced by the print-bar thereof comprise first and second distinct single-print-head slices and a mediating slice therebetween, the first and second single-print-head slices being respectively exclusive for first and second print-heads; ii. the mediating slice includes first and second sets of positions interlaced therein, positions of the first and second set respectively corresponding to nozzle positions for nozzles of the first and second print heads; iii. the deriving of the ICF includes computing first and second extrapolation functions respectively describing extrapolation from the first and second single-print-head slices into the mediating region of DOCI data, or a derivative thereof; and iv. within the mediating region, (A) at positions of the first set, the ICF is derived primarily from the first extrapolation function and (B) at positions of the second set, the ICF is derived primarily from the second extrapolation function.

In some embodiments, i. the printing system is configured so that images produced by the print-bar thereof comprise first and second of distinct single-print-head slices and a interlace slice therebetween, the first and second single-print-head slices being respectively exclusive for first and second print-heads; ii. the interlace slice includes first and second sets of positions interlaced therein, positions of the first and second set respectively corresponding to nozzle positions for nozzles of the first and second print heads; and iii. within the interlace region, the ICF is computed by determining if a position in the mediating region corresponds to a nozzle position of the first print-head or the second print-head, and the ICF is computed according to the results of the determining.

In some embodiments, i. the printing system is configured so that images produced by the print-bar thereof comprise first and second of distinct single-print-head slices and a mediating slice therebetween, the first and second single-print-head slices being respectively exclusive for first and second print-heads; ii. the mediating region includes first $P_1$ and second $P_2$ positions, the first position $P_1$ being closer to the first single-print-head slice than the second $P_2$ position is to the first single-print-head slice, the second position $P_2$ being closer to the second single-print-head slice than the first position $P_1$ is to the second single-print-head slice; iii. the deriving of the ICF includes computing first and second extrapolation functions respectively describing extrapolation from the first and second single-print-head slices into the mediating region of DOCI data, or a derivative thereof; and iv. when computing ICF for the first position, a greater weight is assigned to the second extrapolation function than to the first extrapolation function; and v. when computing ICF for the second position, a greater weight is assigned to the first extrapolation function than to the second extrapolation function.

In some embodiments, the target surface is a surface of an intermediate transfer member (ITM) (for example, a drum or a belt) of the printing system and the ink images formed on the ITM surface by the droplet deposition are subsequently transferred from the ITM to a printing substrate.

A digital printing system comprises: a. a multi-nozzle and multi-head print bar for depositing ink-droplets on a target surface in dependence to received electrical printing signals to form ink-images on the target surface, the multi-nozzle and multi-head print bar defining print and cross-print directions and being configured so that ink-images produced by the multi-head print-bar are dividable into alternating single-print-head slices and interlace slices; and b. a computing system for data-processing and for generating the electrical printing signals so as to control the print bar, the computer system configured to: i. perform a calibration by: A. causing the print bar to print a digital input-calibration-image DICI onto the target surface as to generate an ink calibration-image; B. after the DICI is optically imaged into a digital output-calibration-image DOCI representing the ink-calibration image, processing the DOCI to compute therefrom a representative print-bar tone-reproduction-function trf(bar) for the entire print bar; C. for each slice $slice_i(DOCI)$ of a plurality $\{slice_1(DOCI), slice_2(DOCI) slice_N(DOCI)\}$ of slices of the digital output-calibration-image DOCI, computing a respective slice-specific tone-reproduction-function $trf(slice_i(DOCI))$; and D. deriving a print-bar-spanning image-correction-function ICF (cross-print-direction-location, tone-value) from the slice-specific and/or print-bar tone reproduction function(s) such that within the single-print-head slices, the ICF is derived primarily from region-internal DOCI data and within the interlace slices, the ICF is derived primarily from extrapolation of region external DOCI data; and ii. apply the image-correction-function ICF to a uncorrected digital image UDI so as to compute a corrected digital image CDI; and iii. cause the print bar to print the corrected digital image CDI onto the target surface.

A digital printing system comprises: a. a multi-nozzle and multi-head print bar for depositing ink-droplets on a target surface in dependence to received electrical printing signals to form ink-images on the target surface, the multi-nozzle and multi-head print bar defining print and cross-print directions and being configured so that ink-images produced by the multi-head print-bar comprise first and second distinct single-print-head slices and a mediating slice therebetween, the first and second single-print-head slices being respectively exclusive for first and second print-heads of the multi-head print bar, the mediating slice including first and second sets of positions interlaced therein, positions of the first and second set respectively corresponding to nozzle positions for nozzles of the first and second print heads; and b. a computing system for data-processing and for generating the electrical printing signals so as to control the print bar, the computer system configured to: i. perform a calibration by: A. causing the print bar to print a digital input-calibration-image DICI onto the target surface as to generate an ink calibration-image; B. after the DICI is optically imaged into a digital output-calibration-image DOCI representing the ink-calibration image, processing the DOCI to compute therefrom a representative print-bar tone-reproduction-function trf(bar) for the entire print bar; C. for each slice $slice_i(DOCI)$ of a plurality $\{slice_i(DOCI), slice_2 (DOCI) \ldots slice_N(DOCI)\}$ of slices of the digital output-calibration-image DOCI, computing a respective slice-specific tone-reproduction-function $trf(slice_i(DOCI))$; and D. deriving a print-bar-spanning image-correction-function ICF (cross-print-direction-location, tone-value) from the slice-specific and/or print-bar tone reproduction function(s) such that the deriving of the ICF includes computing first and second extrapolation functions respectively describing extrapolation from the first and second single-print-head slices into the mediating region of DOCI data, or a derivative thereof; and within the mediating region, (I) at positions of the first set, the ICF is derived primarily from the first extrapolation function and (II) at positions of the second set, the ICF is derived primarily from the second extrapolation function; and ii. apply the image-correction-function ICF to a uncorrected digital image UDI so as to compute a corrected digital image CDI; and iii. cause the print bar to print the corrected digital image CDI onto the target surface.

A digital printing system comprises: a. a multi-nozzle and multi-head print bar for depositing ink-droplets on a target surface in dependence to received electrical printing signals to form ink-images on the target surface, the multi-nozzle and multi-head print bar defining print and cross-print directions and being configured so that ink-images produced by the multi-head print-bar comprise first and second of distinct single-print-head slices and a mediating slice therebetween, the first and second single-print-head slices being respectively exclusive for first and second of the print-heads of the multi-head print bar, the interlace slice including first and second sets of positions interlaced therein, positions of the first and second set respectively corresponding to nozzle positions for nozzles of the first and second print heads; and b. a computing system for data-processing and for generating the electrical printing signals so as to control the print bar, the computer system configured to: i. perform a calibration by: A. causing the print bar to print a digital input-calibration-image DICI onto the target surface as to generate an ink calibration-image; B. after the DICI is optically imaged into a digital output-calibration-image DOCI representing the ink-calibration image, processing the DOCI to compute therefrom a representative print-bar tone-reproduction-function trf(bar) for the entire print bar; C. for each slice $slice_i(DOCI)$ of a plurality $\{slice_1(DOCI), slice_2 (DOCI) \ldots slice_N(DOCI)\}$ of slices of the digital output-calibration-image DOCI, computing a respective slice-specific tone-reproduction-function $trf(slice_i(DOCI))$; and D. deriving a print-bar-spanning image-correction-function ICF (cross-print-direction-location, tone-value) from the slice-specific and/or print-bar tone reproduction function(s) such that within the interlace region, the ICF is computed by determining if a position in the mediating region corresponds to a nozzle position of the first print-head or the second print-head, and the ICF is computed according to the results of the determining; and ii. apply the image-correction-function ICF to a uncorrected digital image UDI so as to compute a corrected digital image CDI; and iii. cause the print bar to print the corrected digital image CDI onto the target surface.

A digital printing system comprises: a. a multi-nozzle and multi-head print bar for depositing ink-droplets on a target surface in dependence to received electrical printing signals to form ink-images on the target surface, the multi-nozzle and multi-head print bar defining print and cross-print directions and being configured so that ink-images produced by the multi-head print-bar comprise first and second of distinct single-print-head slices and a mediating slice therebetween, the first and second single-print-head slices being respectively exclusive for first and second print-heads, the mediating region includes first $P_1$ and second $P_2$ positions, the first position $P_1$ being closer to the first single-print-head slice than the second $P_2$ position is to the first single-print-head slice, the second position $P_2$ being closer to the second single-print-head slice than the first position $P_1$ is to the second single-print-head slice; and b. a computing system for data-processing and for generating the electrical printing signals so as to control the print bar, the computer system configured to: i. perform a calibration by: A. causing the print bar to print a digital input-calibration-image DICI onto the target surface as to generate an ink calibration-image; B. after the DICI is optically imaged into a digital output-calibration-image DOCI representing the ink-calibration image, processing the DOCI to compute therefrom a representative print-bar tone-reproduction-function trf(bar) for the entire print bar; C. for each slice $slice_i(DOCI)$ of a plurality $\{slice_1(DOCI), slice_2(DOCI) \ldots slice_N(DOCI)\}$ of slices of the digital output-calibration-image DOCI, computing a respective slice-specific tone-reproduction-function $trf(slice_i(DOCI))$; and D. deriving a print-bar-spanning image-correction-function ICF (cross-print-direction-location, tone-value) from the slice-specific and/or print-bar tone reproduction function(s) such that (i) the deriving of the ICF includes computing first and second extrapolation functions respectively describing extrapolation from the first and second single-print-head slices into the mediating region of DOCI data, or a derivative thereof; and (ii) when computing ICF for the first position, a greater weight is assigned to the second extrapolation function than to the first extrapolation function; and (iii). when computing ICF for the second position, a greater weight is assigned to the first extrapolation function than to the second extrapolation function; and ii. apply the image-correction-function ICF to a uncorrected digital image UDI so as to compute a corrected digital image CDI; and iii. cause the print bar to print the corrected digital image CDI onto the target surface.

A digital printing system comprises: a. a multi-nozzle and multi-head print bar for depositing ink-droplets on a target surface in dependence to received electrical printing signals to form ink-images on the target surface, the multi-nozzle and multi-head print bar defining print and cross-print directions; and b. a computing system for data-processing and for generating the electrical printing signals so as to control the print bar, the computer system configured to: i. perform a calibration by: A. causing the print bar to print a digital input-calibration-image DICI onto the target surface as to generate an ink calibration-image; B. after the DICI is optically imaged into a digital output-calibration-image DOCI representing the ink-calibration image, processing the DOCI to compute therefrom a representative print-bar tone-reproduction-function trf(bar) for the entire print bar; C. for each slice $slice_i(DOCI)$ of a plurality $\{slice_i(DOCI), slice_2 (DOCI) \ldots slice_N(DOCI)\}$ of slices of the digital output-calibration-image DOCI, computing a respective slice-specific tone-reproduction-function $trf(slice_i(DOCI))$; and D. for each of slice $slice_i(DOCI)$ of the slice-plurality, applying a respective inverse of a respective slice-specific tone-reproduction-function to the representative print-bar tone-reproduction-function trf(bar) to yield a tone-shift-function-set $tsfs(DOCI)=\{tsf\_slice_1(DOCI)(tone-value), tsf\_slice_2(DOCI)(tone-value), \ldots tsf\_slice_N(DOCI)(tone-value)\}$ of slice-specific tone-shift functions; and E. deriving a print-bar-spanning image-correction-function ICF (cross-print-direction-location, tone-value) from the tone-shift-function-set tsfs(DOCI) of slice-specific tone-shift functions; ii. apply the image-correction-function ICF to a uncorrected digital image UDI so as to compute a corrected digital image CDI; and iii. cause the print bar to print the corrected digital image CDI onto the target surface.

In some embodiments, i. the computing system is further configured to perform the calibration by, for each of slice $slice_i(DOCI)$ of the slice plurality, applying a respective inverse of a respective slice-specific tone-reproduction-function to the representative print-bar tone-reproduction-function trf(bar) to yield a tone-shift-function-set tsfs (DOCI)=$\{tsf\_slice_1(DOCI)(tone-value), tsf\_slice_2(DOCI)(tone-value), \ldots tsf\_slice_N(DOCI)(tone-value)\}$ of slice-specific tone-shift functions; and ii. the computing system is further configured to derive the print-bar-spanning image-correction-function ICF (cross-print-direction-location, tone-value) from the tone-shift-function-set tsfs(DOCI) of slice-specific tone-shift functions.

In some embodiments, the system further comprises: c. an intermediate transfer member (ITM) (for example, a drum or a belt); and d. an impression station, wherein: (i) the target surface on which the ink-images are formed by the print bar is a surface of the ITM; (ii) the ITM is guided so that ink images formed on the ITM surface are subsequently to the impression station; and (iii) the ink images are transferred, at the impression station, from the ITM to substrate.

BRIEF DESCRIPTION OF THE DRAWINGS

FIG. 8A illustrates an arbitrary image.

Figure 1A:
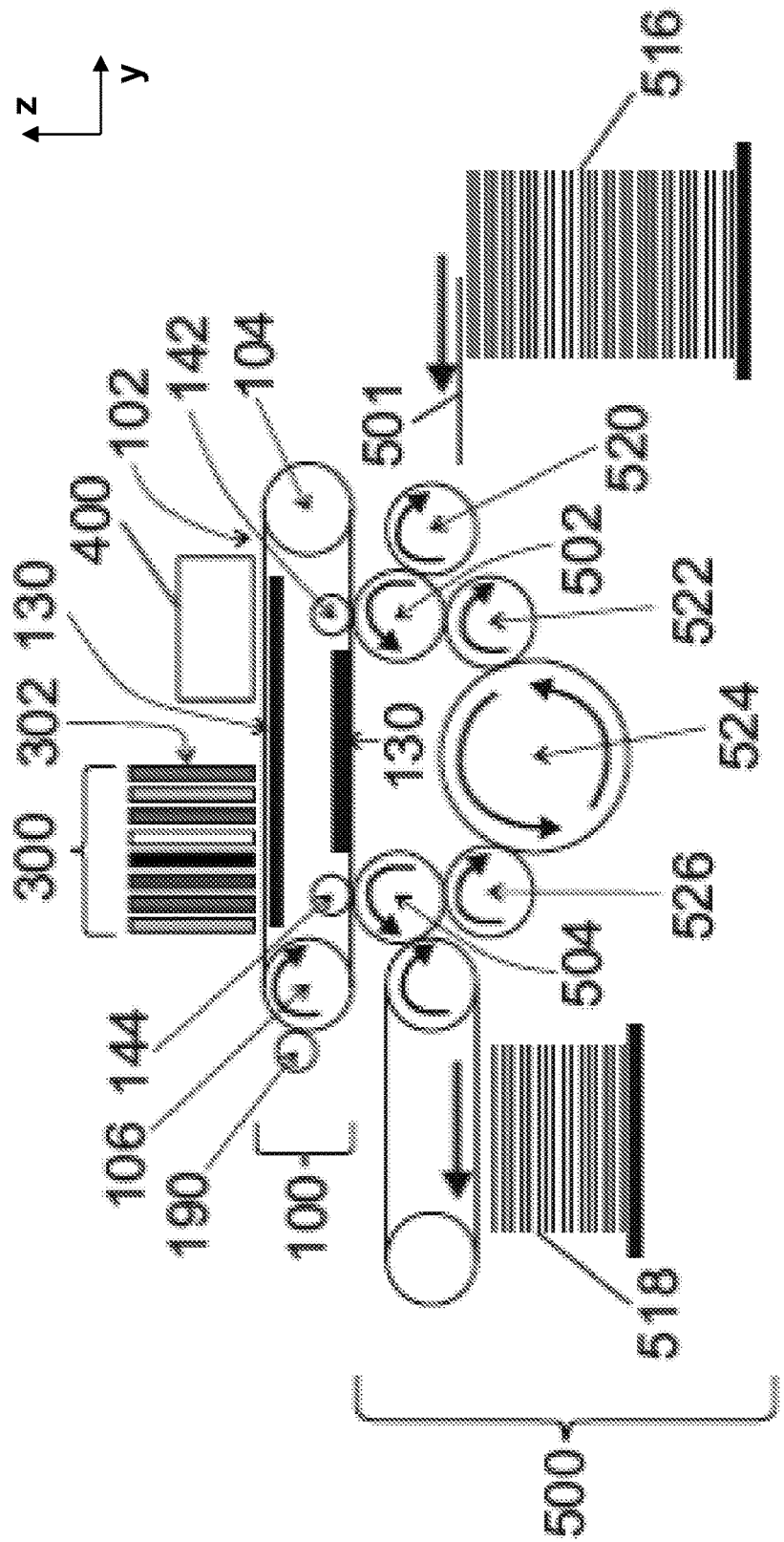
FIGS. 1A and 2A-2B schematically illustrate printing systems.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate identical components but may not be referenced in the description of all figures.

DETAILED DESCRIPTION OF ILLUSTRATED EMBODIMENTS

Embodiments of the present invention relate to novel techniques for reducing or eliminating such image non-uniformities. Towards this end, it is useful to print a digital calibration input image (DICI) having known properties (i.e. defined tone value as a function of pixel-location) and to compute correction data by analyzing the calibration ink image resulting from printing the digital calibration input image. The printing device then operates in accordance with the correction data, to reduce or eliminate image non-uniformity.

Figure 1B:
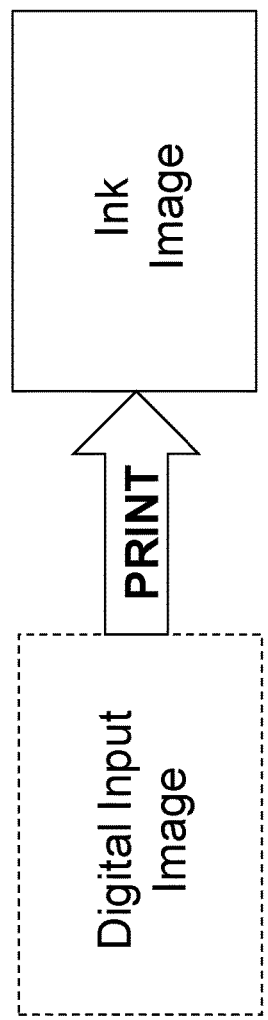
FIG. 1B is a flow chart of a method of operating a printing system.
Figure 5:
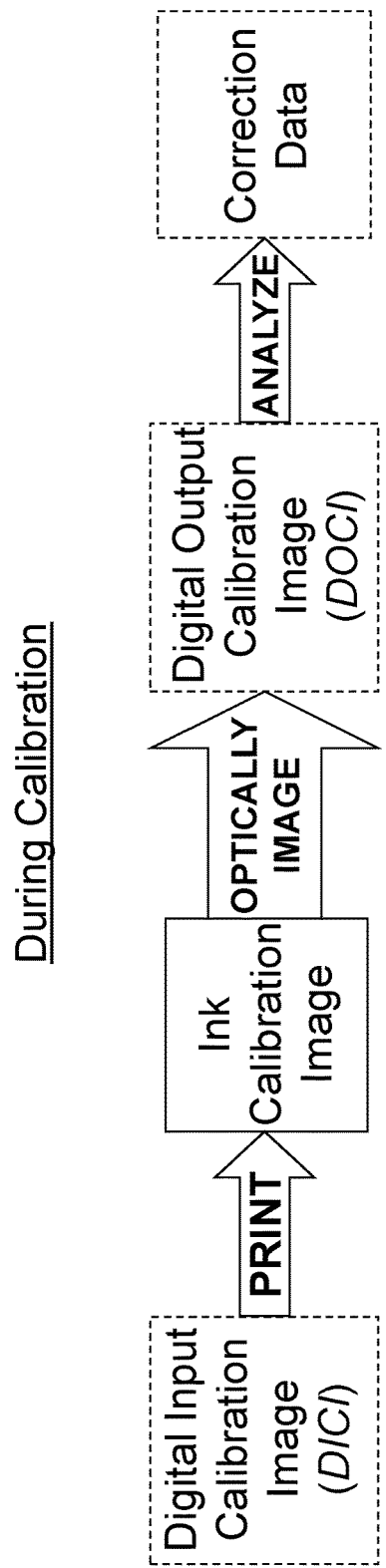
FIG. 5 is a flow chart of a method of calibration.

FIGS. 1B and 5 respectively illustrate operation and calibration of a printing system (i.e. implementing either an indirect printing process or a direct printing process). FIG. 5 relates specifically to calibration—FIG. 1B relates to operation both in the context of calibration and in other contexts. One particular type of digital input image that is printed according to the FIG. 1B is a 'digital input calibration image' (DICI). Non-limiting examples of DICI are discussed below, with reference to FIGS. 9A-9B.

As shown in FIG. 5, the ink image obtained by printing the DICI is referred to as an 'ink calibration image' and may be located either on an ITM or on substrate. The ink calibration image is optically imaged (e.g., scanned or photographed) to acquire a digital output calibration image (DOCI) (e.g., an array of pixels) stored in volatile or non-volatile computer memory or in other storage. The DOCI may be electronically analyzed to yield correction data. As noted above, the printing device then operates in accordance with the correction data, to reduce or eliminate image non-uniformity.

Figure 4:
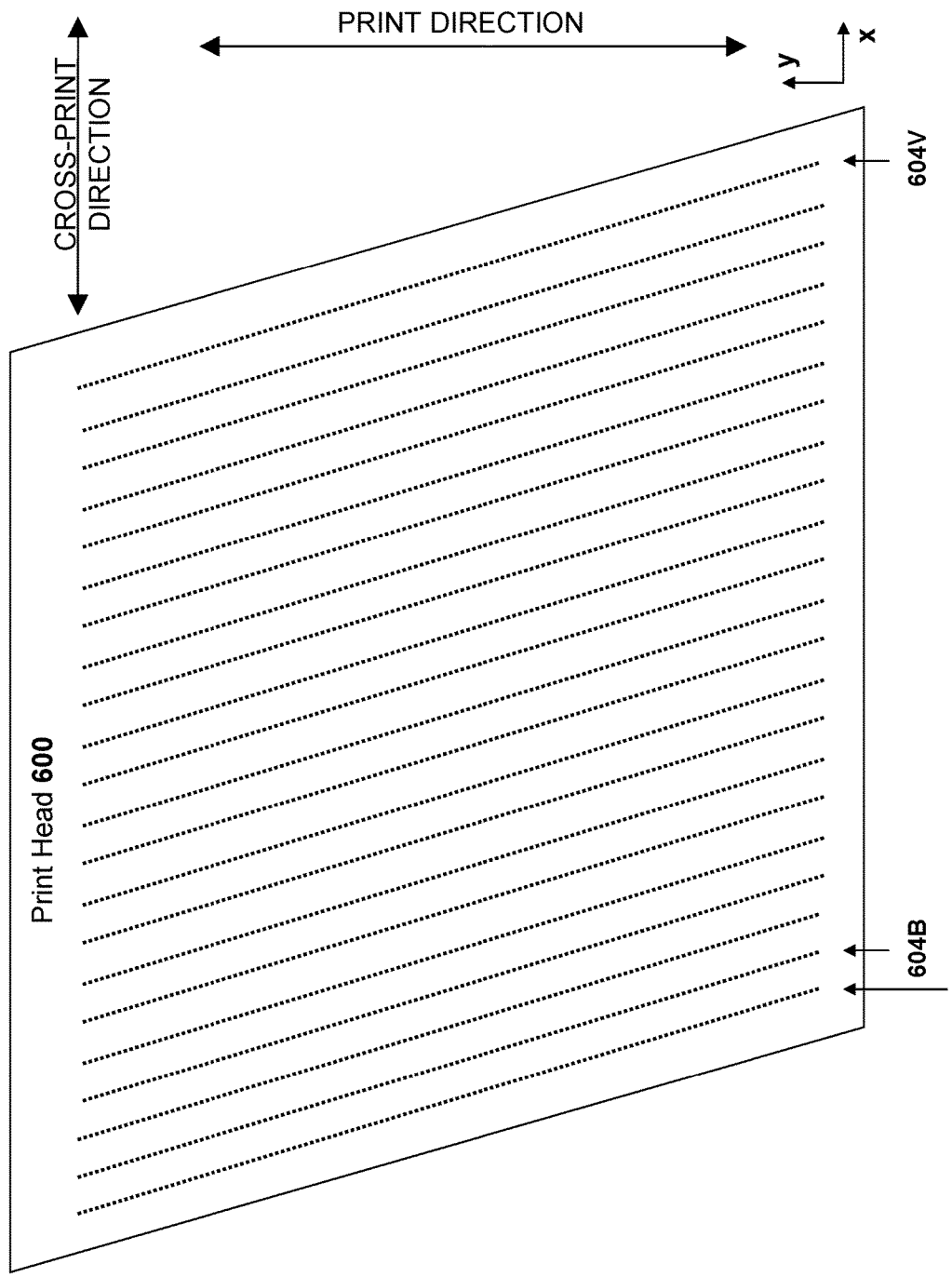
FIG. 4 schematically illustrates nozzles disposed on a print head.

Reference is made, once again, to FIG. 4. As illustrated in FIG. 4, a print head comprises a plurality of nozzles that may form an array of rows and columns with various possibilities of alignment or staggering. In the example of FIG. 4, the nozzles are arranged in lines 604A-604V. In the example of FIG. 4, these lines are 'diagonal' or slanted and are neither in the print direction nor in the cross-print direction.

Figure 3:
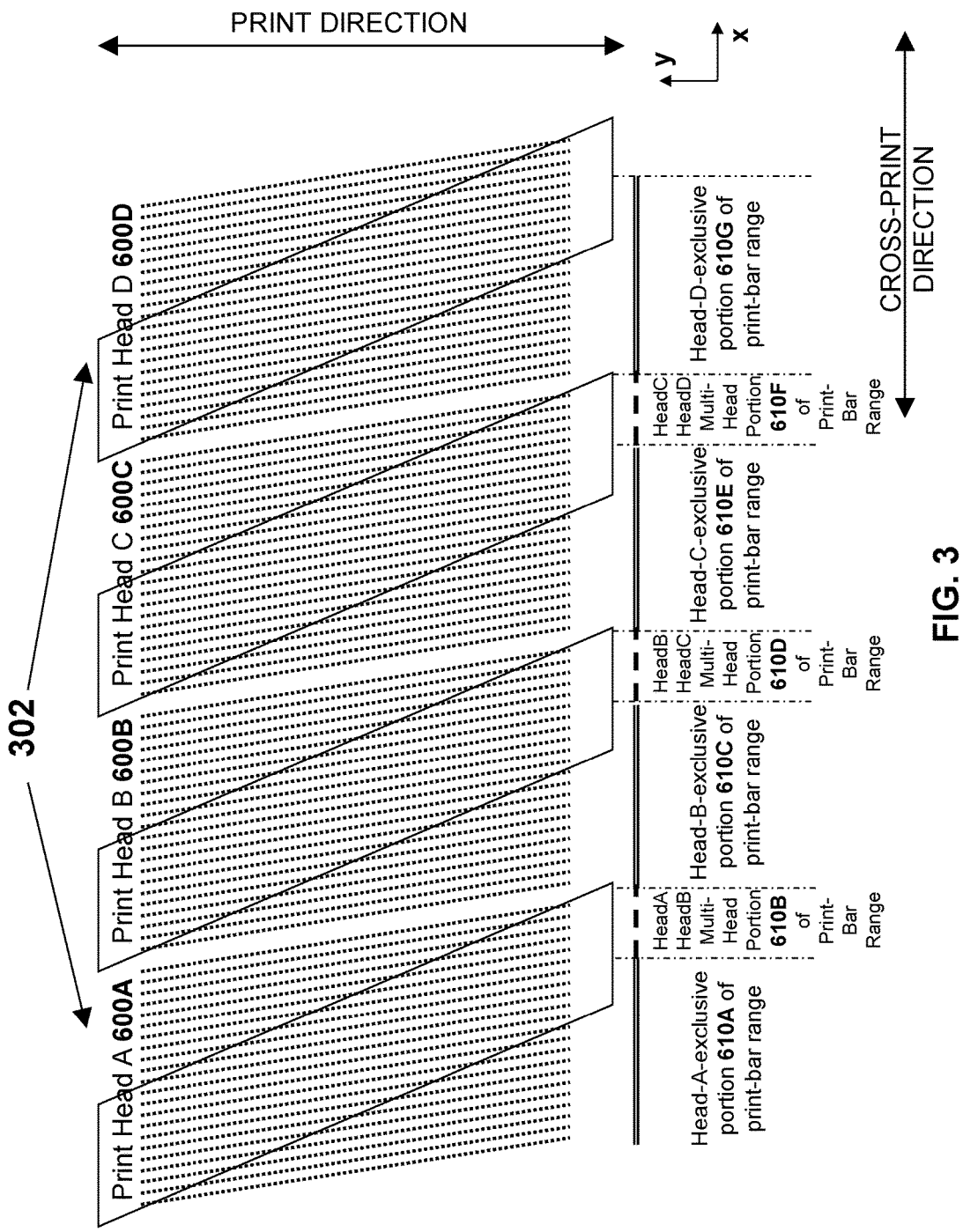
FIG. 3 schematically illustrates an array of print heads.

Referring to FIG. 3, it is noted that each print head of this particular example has a parallelogram shape—the nozzle lines in this example are parallel to two sides of the parallelogram. It is understood that print heads may have different shapes and be positioned in numerous manners in a print bar. Depending on shape and positioning, the nozzles of two adjacent print heads may either exclusively deposit ink droplets in separate segments of the target surface or deposit ink droplets in at least partially overlapping segments. For instance, print heads having square or rectangular shape if aligned to form a single contiguous row may never "interact" with one another as far as the resulting ink image is concerned, namely each affecting different segments and lacking overlap. Print heads with such shapes if aligned on two or more rows staggered among them, e.g., forming a "brick-wall" structure, may "interact" with one another, at least part of their respective nozzles being able to deposit ink droplets on overlapping segments of the target surface. Additional print head shapes that may result in overlapping ink deposition include for example triangles and trapezes which may be each alternatively positioned "head up" and "head down" along the length of a print bar. Print heads having rhomboid shape may also be aligned to form a larger rhomboid, portions of which heads may interfere with portions of adjacent print heads. Such situation where nozzles of one print head are so positioned in relation to nozzles on an adjacent head so that the ink droplets each may deposit can share overlapping segment of target surface is exemplified in FIG. 3.

The print bar 302 is disposed along the cross-print direction i.e. along the X-axis. In the example of FIG. 3, the print bar comprises multiple print heads immediately adjacent to each other and disposed along the axis defined by the cross-print direction.

The print bar spans a certain range along the cross-print direction—this is referred to as the "print bar range" $[x_{min}^{print\text{-}bar}, x_{max}^{print\text{-}bar}]$ or the print bar length. Typically, the print-bar range is commensurate with one dimension of the target surface, and for instance would suit at least one dimension of a sheet of substrate, or the width of a web-substrate, or the cross-print dimension of an ITM. The print-bar range $[x_{min}^{print\text{-}bar}, x_{max}^{print\text{-}bar}]$ may be divided into a plurality of subranges, for instance according to the number and/or geometry of the print heads. Thus, as shown in FIG. 3, the subrange of the print bar range (i.e. a portion of the X-axis) where print heads A-D are located includes the following seven portions: (i) Head-A-exclusive-portion 610A of print-bar range, (ii) Head A-Head B multi-head portion 610B of the print-bar range; (iii) Head-B-exclusive-portion 610C of print-bar range, (iv) Head B-Head C multi-head portion 610D of the print-bar range; (v) Head-C-exclusive-portion 610E of print-bar range, (vi) Head C-Head D multi-head portion 610F of the print-bar range; and (vii) Head-D-exclusive-portion 610G of print-bar range.

Thus, it is noted that (i) in the portion of the print bar 302 having an "x" coordinate within the subrange 610A, only ink droplets from print head A 600A are deposited on the target surface; (ii) in the portion of the print bar 302 having an "x" coordinate within the subrange 610B, a combination of ink droplets from print head A 600A and ink droplets from print head B 600B are deposited on the target surface; (iii) in the portion of the print bar 302 having an "x" coordinate within the subrange 610C, only ink droplets from print head B 600B are deposited on the target surface; (iv) in the portion of the print bar 302 having an "x" coordinate within the subrange 610D, a combination of ink droplets from print head B 600B and ink droplets from print head C 600C are deposited on the target surface; (v) in the portion of the print bar 302 having an "x" coordinate within the subrange 610E, only ink droplets from print head C 600C are deposited on the target surface; (vi) in the portion of the print bar 302 having an "x" coordinate within the subrange 610F, a combination of ink droplets from print head C 600C and ink droplets from print head D 600D are deposited on the target surface; and (vii) in the portion of the print bar 302 having an "x" coordinate within the subrange 610G, only ink droplets from print head D 600D are deposited on the target surface.

Figure 6:
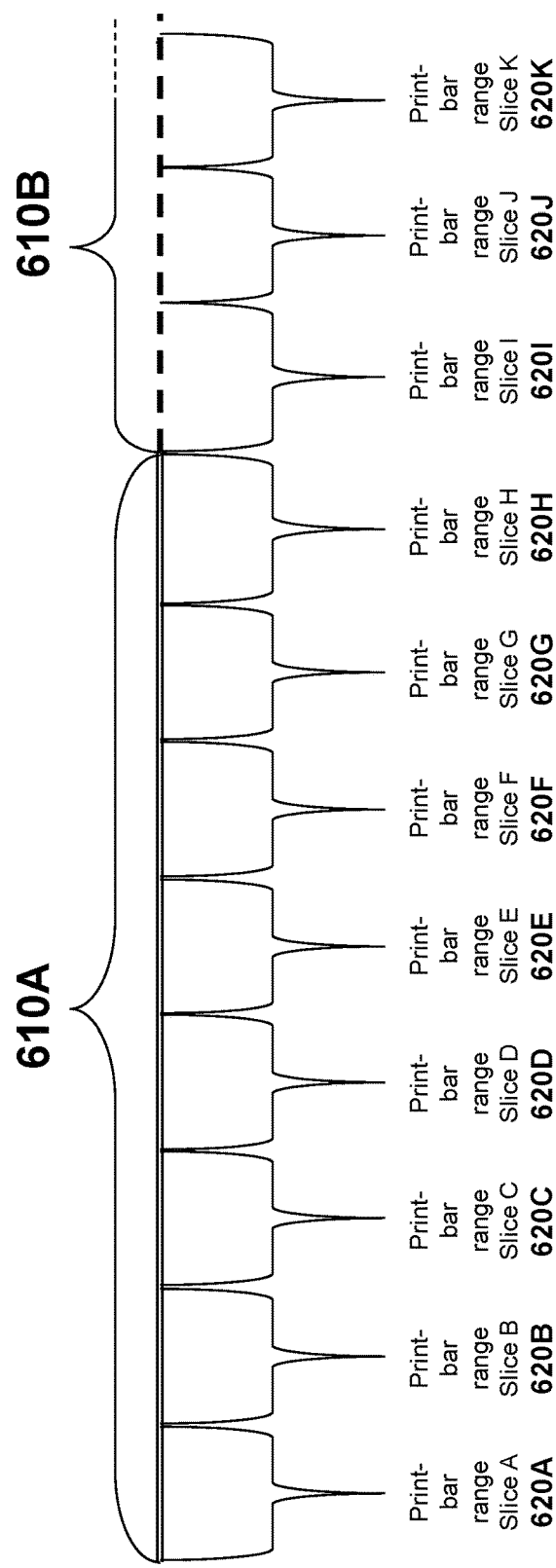
FIG. 6 illustrates slice ranges of a print-bar or portion thereof.

Reference is now made to FIG. 6. As illustrated in FIG. 6, the print-bar range $[x_{min}^{print\text{-}bar}, x_{max}^{print\text{-}bar}]$ may be divided into "smaller subranges" that are even smaller than the subranges 610A-610G described in FIG. 3. These smaller subranges are referred to as the print-bar range slices. FIG. 6 illustrates eleven such 'slices' 620A-620K, eight of which are within subrange 610A and three of which are within subrange 610B. In FIG. 6, the slices all have approximately the same thickness—this is certainly not a limitation, and only relates to that particular example.

The term 'slice' refers to a portion of any 'physical' image (i.e. ink image) or digital image (e.g., DICI or DOCI) defined by a sub-range in the cross-print direction. Thus, a 'slice' is an example of a 'region' or 'sub-region' or 'sub-range' of an ink or digital image. Unless specified otherwise, a slice may be of any thickness. A sub-slice of a slice is also, by definition, a slice. Particular examples of slices are discussed in the present disclosure.

The term 'mediating' slice will now be defined with respect to a first slice defined by a range $[x_{min}^{first}, x_{max}^{first}]$ in the cross-print direction, a second slice defined by a range $[x_{min}^{second}, x_{max}^{second}]$ in the cross-print direction, and a third slice defined by a range $[x_{min}^{third}, x_{max}^{third}]$ in the cross-print direction. In this example, if $x_{min}^{third} \geq$ $x_{max}^{second} \geq x_{min}^{second} \geq x_{max}^{first}$, then the 'second slice' is said to be a 'mediating slice' between the first and third slice.

Figure 7A:
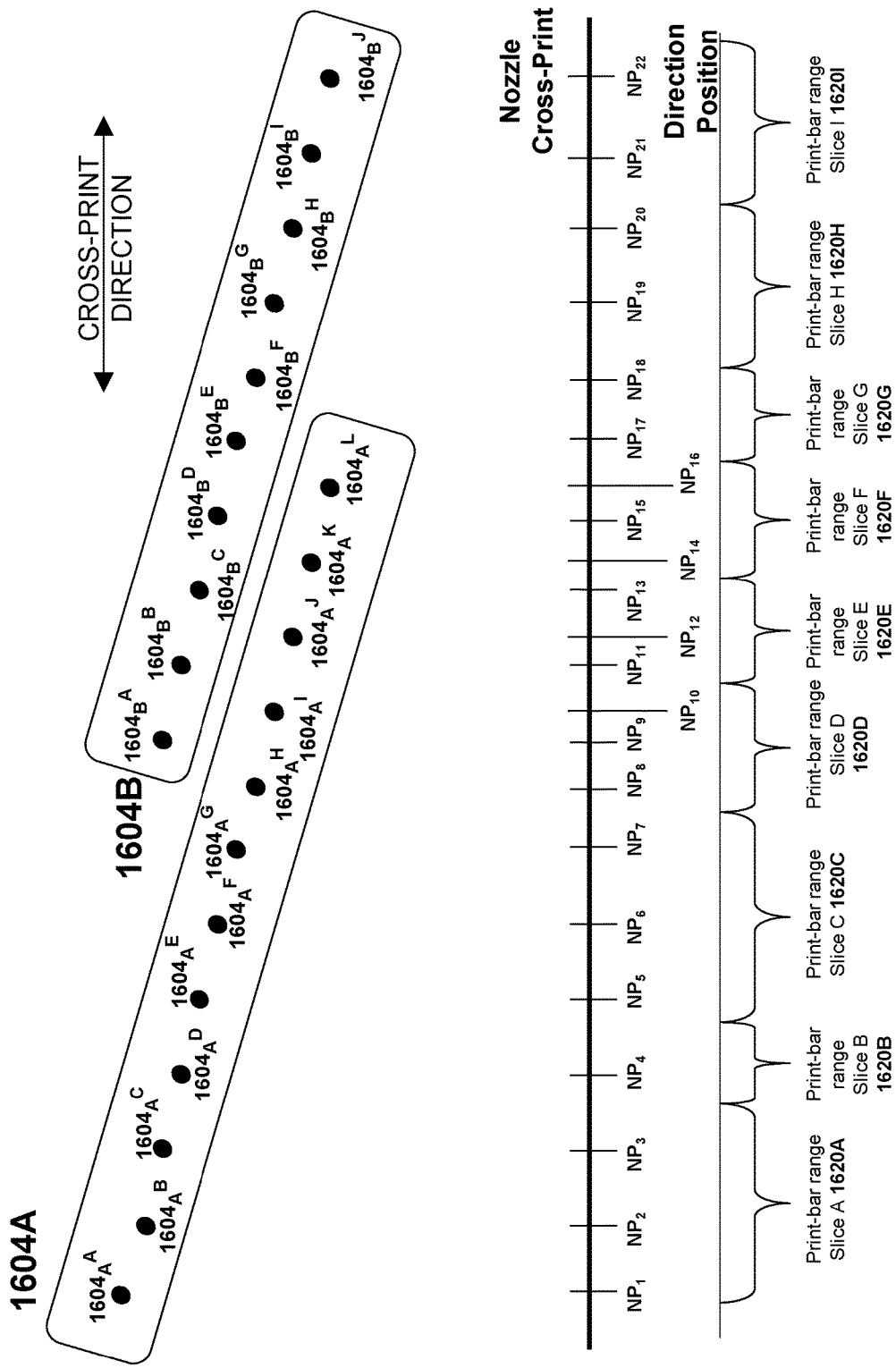
FIG. 7A-7B illustrate nozzle positions and print-bar ranges.
Figure 7B:
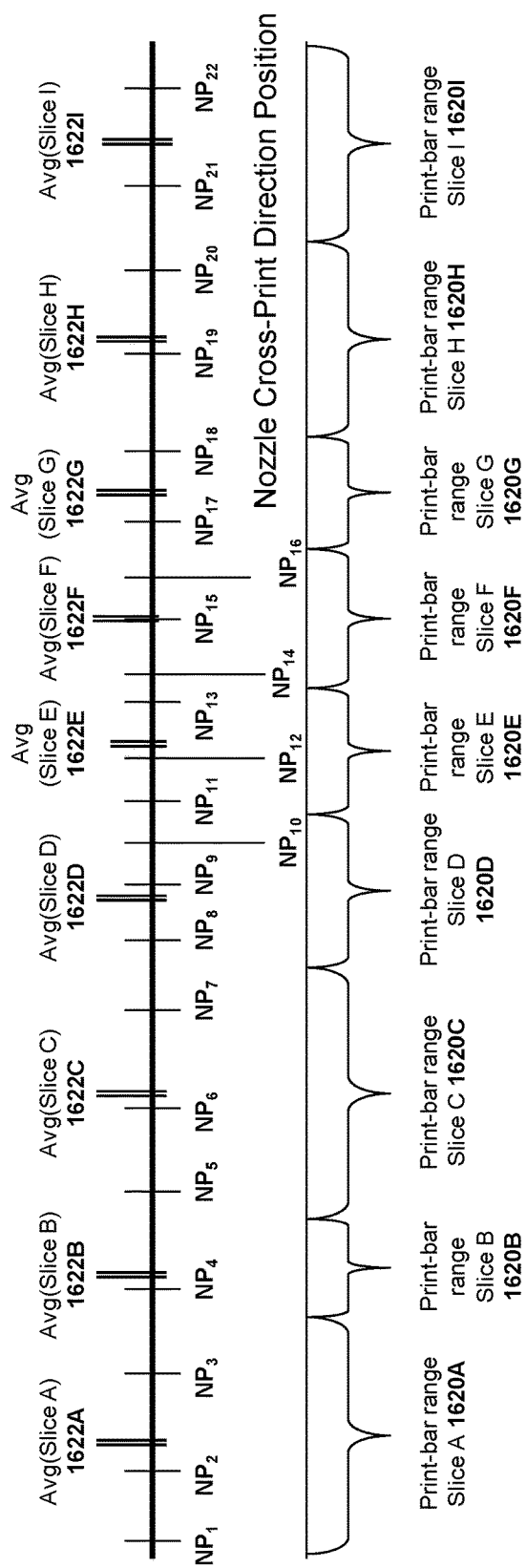

FIGS. 7A-7B refer to yet another example. FIG. 7A illustrates two print heads 1604A and 1604B. In the non-limiting example of FIG. 7A, print head 1604A includes 12 nozzles $1604_A^A$-$1604_A^L$ disposed along a first line and print head 1604B includes 10 nozzles $1604B_B^A$-$1604_B^J$ disposed along a second line. In FIGS. 7A-7B "NP" is an abbreviation for 'nozzle position' (i.e. position in the 'cross-print' direction).

As illustrated in FIGS. 7A-7B, each nozzle has a position ($NP_i$) in the cross-print direction. Assuming that ink droplets are deposited directly beneath each nozzle, each nozzle position on the print head/print bar in the cross-print direction defines a cross-print-direction position of an "ink-image-pixel" in the ink-image that is printed to the target surface (i.e. substrate or ITM).

Twenty-two nozzles are illustrated in FIG. 7A—their respective positions in the cross-print direction from the view point of the target surface are marked as $NP_i$ where i is a positive integer between 1 and 22. Unless specified otherwise (or clear from the context), a nozzle 'position' relates to a position of the nozzle in the cross-print direction. By way of example, slice 1620A contains three nozzle-positions ($NP_1$-$NP_3$), while slice 1620B contains 1 nozzle-position ($NP_4$), and so on.

Also illustrated in FIGS. 7A-7B are 9 slices 1620A-1620I. Within the first slice 1620A are located the positions $NP_1$-$NP_3$ (i.e. positions in the 'cross-print direction') of 3 nozzles $1604_A^A$-$1604_A^C$; within the second slice 1620B is located the position $NP_4$ of a single nozzle $1604_A^D$; within the third slice 1620C are located the positions $NP_5$-$NP_7$ of 3 nozzles $1604_A^E$-$1604_A^G$; within the fourth slice 1620D are located the positions $NP_8$-$NP_{10}$ of 3 nozzles $1604_A^H$, $1604_B^A$ and $1604_A^I$; within the fifth slice 1620E are located the positions $NP_{11}$-$NP_{13}$ of 3 nozzles $1604_B^B$, $1604_A^J$ and $1604_B^C$; and within the sixth slice 1620F are located the positions $NP_{14}$-$NP_{16}$ of 3 nozzles $1604_A^K$, $1604_B^D$ and $1604_A^L$; within the seventh slice 1620G are located the positions $NP_{17}$-$NP_{18}$ of 2 nozzles $1604_B^E$ and $1604_B^F$; within the eighth slice 1620H are located the positions $NP_{19}$-$NP_{20}$ of 2 nozzles $1604_B^G$-$1604_B^H$; and within the ninth slice 1620I are located the positions $NP_{21}$-$NP_{22}$ of 2 nozzles $1604_B^I$-$1604_B^J$.

As illustrated in FIG. 7A, Slices A-Slices C 1620A-162C are "single-print head slices"—within each of slices 1620A-1620C are only nozzle positions (i.e. position in the 'cross-print' direction) of nozzles of a single print head—in this case, of print head 1604A. Similarly, Slices H-Slices I 1620H-1620I are also "single-print head slices"—within each of slices 16220H-1620I are only nozzle positions of nozzles of a single print head—in this case of print head 1604B.

In contrast to slices 1620A-1620C and 1620H-1620I, slices 1620D-1620F are 'interlace' or 'stitch' slices. The interlace or stitch slices must include a sequence as follows (i.e. moving in a single direction in the cross-print direction): (i) a nozzle position of a nozzle of a first print head; (ii) a nozzle position of a nozzle of a second print head; and (iii) a nozzle position of a nozzle of the first print head. Thus, for example, for slice 1620D moving from left to right in the cross print direction as illustrated in FIG. 7A, are the following nozzle positions (i) $NP_8$ (i.e. corresponding to the position of nozzle $1604_A^H$ of print head 1604A) (ii) $NP_9$ (i.e. corresponding to the position of nozzle $1604_B^A$ of print head 1604B) and (iii) $NP_{10}$ (i.e. corresponding to the position of nozzle $1604_A^I$ of print head 1604A). Thus, slice 1620D is characterized by the nozzle-position sequence {$NP_8$, $NP_9$, $NP_{10}$}, by the nozzle sequence {$1604_A^H$, $1604_B^A$, $1604_A^I$}, and by the print-head sequence {1604A, 1604B, 1604A}.

Thus, generally speaking a 'stitch' or 'interlace slice' is characterized by the print head sequence { ... X ... , Y ... , X ... } where X is a first print head and Y is second print head different from the first print head. Specific examples sequences that comply with the { ... X ... , Y ... , X ... } pattern include but are not limited to: (i) {X,Y,X}; (ii) {Y,Y,Y,X,Y,X}; (iii) {X,X,X,Y,X}; (iv) {X,Y, Y,Y,X}; (v) {X,Y,X,Y,X}; and so on.

Similarly, for a set of positions {$POS_1$, $POS_2$ ... } where every position corresponds to a nozzle position of a print head X or a print head Y, the set of positions is an 'interlace' or 'stitch set' is the set is characterized by the print head sequence { ... X ... , Y ... , X ... }.

Figure 8B:
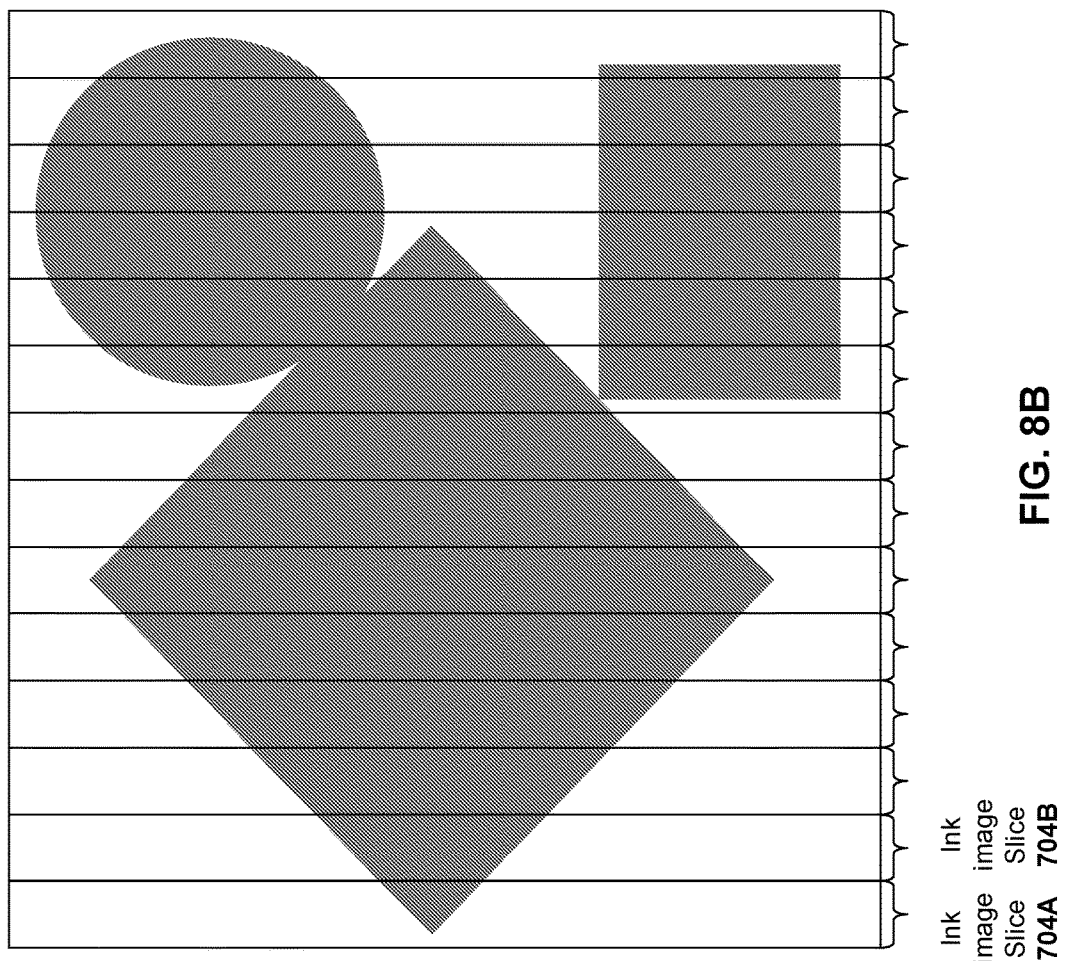
FIG. 8B illustrates slices of the arbitrary image.

As shown in FIG. 7B, each slice has an average position in the cross-print direction. The average position of slice A 1620A is labeled as 1622A, the average position of slice B 1620B is labeled as 1622B, and so on. FIG. 8A illustrates an arbitrary ink-image 700 formed on an ITM or on a substrate. FIG. 8B illustrates the same arbitrary ink-image divided into 'ink-image slices.' The ink-image slices of FIG. 8B correspond to the print-bar range slices of FIG. 7. In particular, ink-image slice 704A is formed only by nozzles disposed within print-bar range slice 1620A, ink-image slice 704B is formed only by nozzles disposed within print-bar range slice 1620B, and so-on. Every image, no matter what its content, may be divided into ink-image slices (e.g., having a central or elongate axis along the 'print direction') that correspond to ink deposited from nozzles in corresponding print-bar range slices.

Figure 9A:
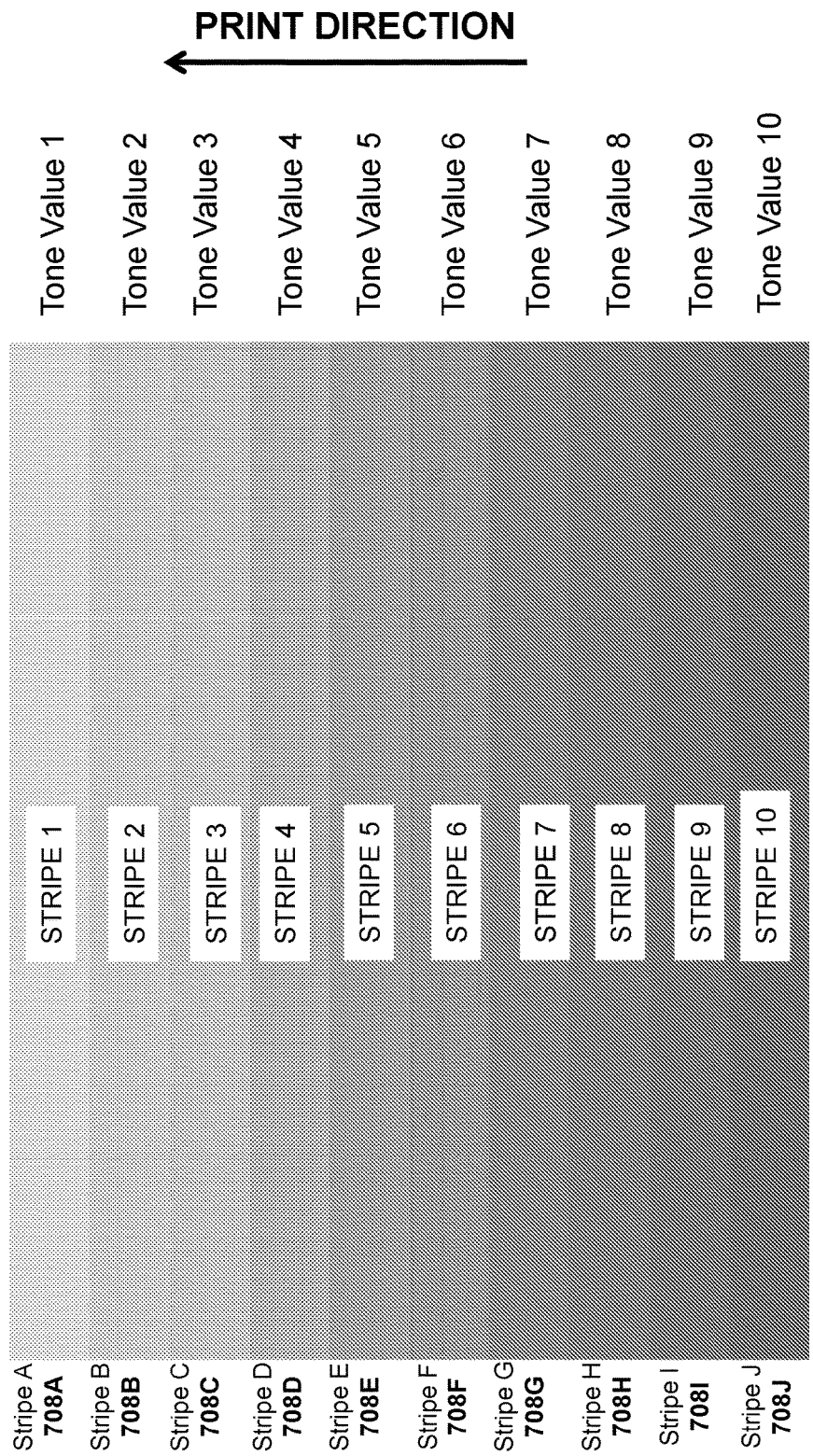
FIG. 9A illustrates a calibration image.

FIG. 9A illustrates a multi-stripe digital input image that is particularly useful as a digital input calibration image (DICI). The image is divided into a plurality of stripes oriented along the cross-print direction. A specific method for computing correction data (see FIG. 5) is now explained in terms of the non-limiting example where the digital image of FIG. 9A is the digital input calibration image (DICI). It is appreciated that the DICI of FIG. 9A is only one specific example of a DICI and is not intended as being limiting.

The stripe divisions of FIG. 9A, illustrated by 708A to 708J, are on the basis of position in the 'printing direction' and according to tone value. As was the case for the image of FIG. 8A, it is possible to further divide the image into slices, illustrated by 704A-704H in FIG. 9B, according to position in the cross-print direction. Because of the unique multi-stripe structure of the image of FIG. 9A, the further slice-subdivision of FIG. 9B yields a plurality of tiles $TILE_A^A$ ... $TILE_H^J$ numbered as 712(A,A) ... 712(H,J). In the specific example of FIG. 9B, 80 tiles are defined—80 being the product of the number of slices (8) and the number of stripes (10).

Each stripe of the digital image of FIG. 9A has a uniform tone value. In the non-limiting example of FIG. 9A, the digital input image has 10 stripes at 10 different tone-values. Because the tone-value of each stripe in the digital image is uniform, the average tone value within each tile within a specific stripe is necessarily equal to the average tone value of the slice as a whole. For the digital image, the respective tile-averaged tone values of each tile for all tiles within a particular stripe are all equal to each other.

When the digital image of FIG. 9A is printed to form the ink-image, the resulting image generally has the form of the digital image original—i.e. a plurality of generally monotonic stripes. However, due to printing non-uniformities associated with the physical printing, the properties of the digital image described in the previous paragraph do not necessarily hold for the ink-image (i.e. where luminance values of the ink-image are considered instead of tone-values). Instead, the luminance value within each stripe may fluctuate. Furthermore, when each stripe of the ink-image is divided into analogous tiles (i.e. according to the same slice-ranges used for the digital input image of FIG. 9B), tiles within each of the stripes do not necessarily share same tile-averaged luminance value, as was the case for the corresponding digital input image of FIG. 9B (i.e. where tile-average tone values were considered). In contrast to the corresponding digital input image, there can be a variation among the tile-average luminance values, due to non-uniform luminance within each stripe.

Generally speaking, each tile within a stripe has both (i) an average position x in the cross-print direction (i.e. if the tile is defined by a slice having a range $[x_A, x_B]$ in the cross print direction the average position x in the cross-print direction is $(x_A+x_B)/2$; and (ii) an average luminance value. Thus, N tiles (where N is a positive integer) are characterized by N points—these points are defined as ordered pairs (x,y) where x=the average cross-print-direction position of the each given tile and y=the average luminance value within the tile.

Figure 10:
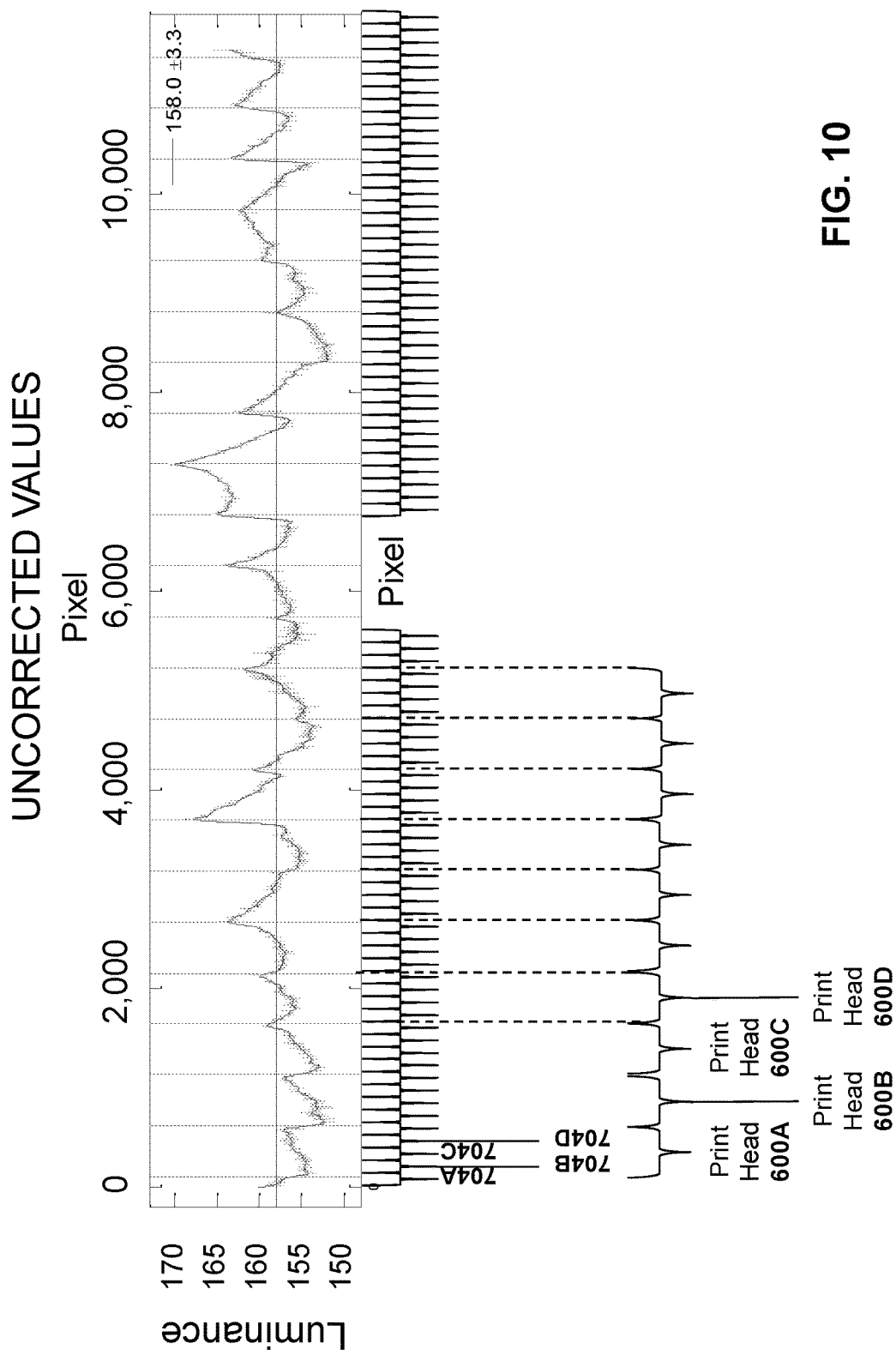
FIG. 10 illustrates luminance as a function position in the cross-print direction for the case of a uniform tone value for an uncorrected image.

FIG. 10 illustrates for an ink image on a printing 'target surface' (i.e. substrate or ITM) the luminance as a function of cross-print-direction position for an example stripe having a tone-value and/or 'intended luminance' of about 158.0. Due to non-uniformity effects, the luminance is not, in fact, constant, but rather fluctuates (standard deviation=3.3 tone value) as a function of position in the cross-print-direction, as shown in FIG. 10.

FIG. 10 was generated by: (i) printing the digital input calibration image (DICI) illustrated in FIG. 9 on a printing substrate (e.g., indirectly through an ITM); (ii) digitizing (e.g., scanning) the ink calibration-image to generate a digital output calibration image (DOCI); (iii) dividing a single stripe of the DOCI of the ink-image into N tiles (not necessarily of the same size); (iv) computing the respective tile-average luminance value for each of the tiles to generate N points (i.e. defined as ordered pairs (x,y) where x=the average cross-print-direction position of the each given tile and y=the average luminance value within the tile) and (v) interpolating luminance in the cross-print direction.

FIG. 10 also illustrates how the print bar length could be divided in subranges, some corresponding to the print heads, exemplified in the figure by 600A to 600D, other corresponding to further subdivision into smaller slices, exemplified in the figure by 704A to 704D. The width of a slice can be selected for any printing system according to each print bar and constituting print heads. In various embodiments, a slice has a width of no less than 4 pixels and optionally no more than 64 pixels, but this need not be limiting.

For an ideal printing system under ideal conditions, the graph of FIG. 10 is a flat line at constant or "uniform" luminance value. Embodiments of the present invention relate to techniques for correcting for the non-uniformities similar to those presented in FIG. 10. Towards this end (and as discussed above with reference to FIGS. 1B and 5), a two stage method is described: the first stage is a calibration stage where an ink-output is analyzed to generate correction data and the second stage is an 'online' printing stage where the correction data is employed to reduce non-uniformities of the type presented in FIG. 10.

Calibration—

Figure 11:
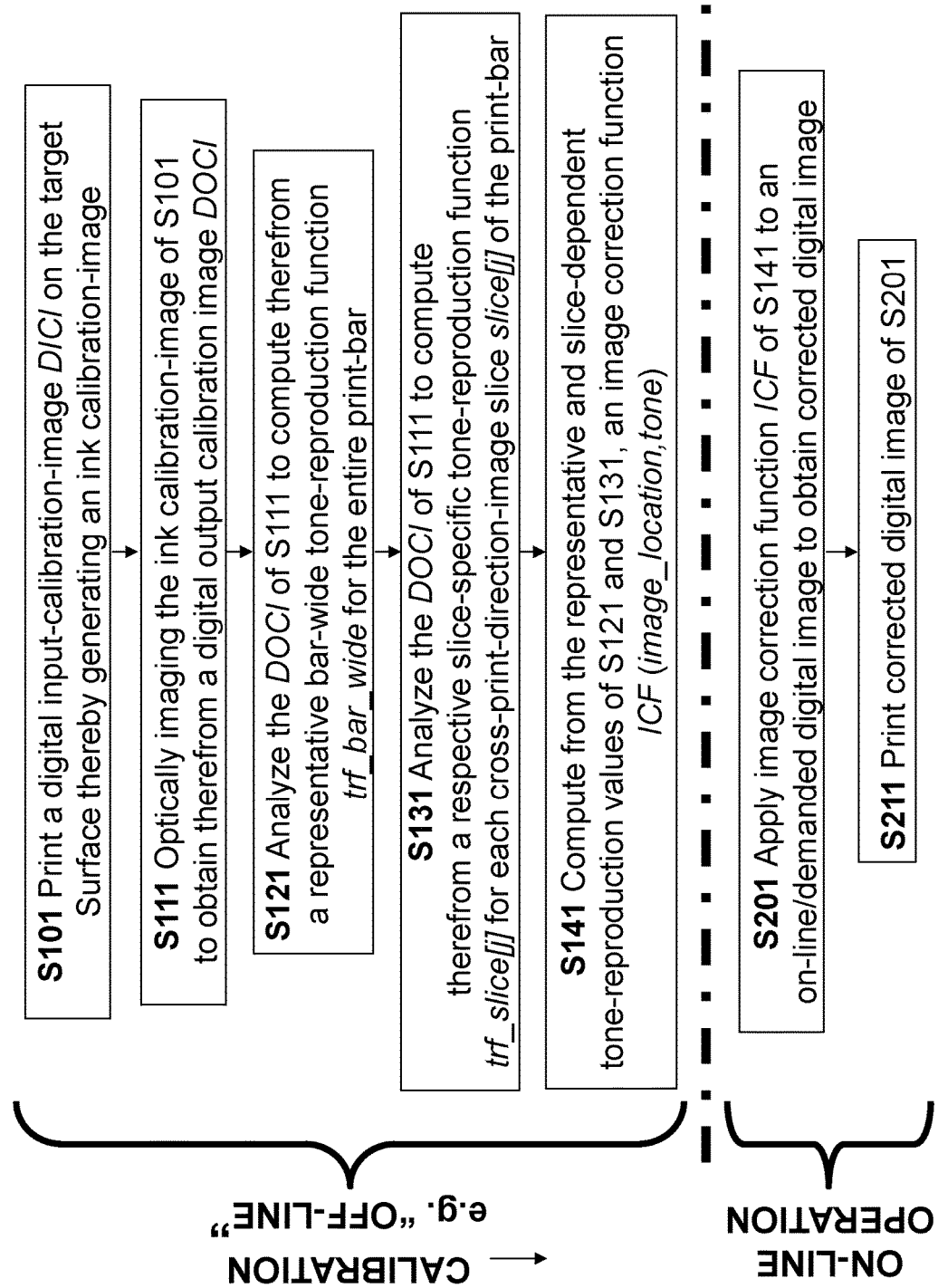
FIGS. 11-13 and 15 are flow charts related to image calibration and/or printing.

FIG. 11 is a flow chart of a method for calibration of a digital printer and subsequent on-line operation. FIGS. 12-15 relate to individual steps in FIG. 11. FIGS. 11-15 will now be explained in terms of the digital image of FIGS. 9A-9B—however, once again it is noted that this is just an example and not intended as limiting.

The calibration stage (i.e. steps S101-S141) is based upon computing tone reproduction functions. In particular, it is possible to compute both (i) a print-bar wide tone reproduction function (see step S121 and FIG. 12 which is an example implementation of step S121) and (ii) a slice-specific tone reproduction functions for multiple slices in the cross-print direction see step S131 and FIG. 13 which is an example implementation of step S131). Although the calibration image of FIG. 9A is not a limitation, techniques for computing the tone-reproduction functions will be explained in terms of the example of FIG. 9A.

In step S101 of FIG. 11, a digital input-calibration-image DICI (e.g., that of FIGS. 9A-9B) is printed on the target surface to generate an ink calibration-image. In step S111, the ink calibration-image is optically-imaged (e.g., scanned or photographed) to obtain therefrom a digital output-calibration-image DOCI. In steps S121-S141 the digital output-calibration-image DOCI is analyzed to generate calibration data. More specifically, (i) in steps S121 and S131 tone reproduction functions are computed; and (ii) in step S141, an image correction function ICF is computed from the tone reproduction functions.

The skilled artisan will appreciate that a 'tone reproduction function' describes the luminance obtained (i.e. by printing) in an ink image as a function of the tone-value in the digital image.

FIG. 11 explains calibration and correction stages in terms of 'off-line' and 'on-line.' This is not a limitation as far as the former stage is concerned—any presently disclosed teaching may be implemented in the context of off-line calibration or on-line calibrations (e.g., instead of printing a single calibration image on a single target surface, different portions of the calibration image may be printed on different target surfaces, or portions thereof, or at different locations on a single target surface. Any reference herein to 'off-line' is therefore understood that 'off-line' is just a particular example of calibration stage. Additionally, 'off-line' and 'on-line' calibration may be combined. For example, 'off-line' calibration may be conducted by printing a single calibration image on a single target surface to establish a first correction function, the efficacy of which may be subsequently monitored and/or ascertained using portions of a calibration image (e.g., same or different from first 'off-line' calibration image) printed on portions of different target surfaces (e.g., on the margins surrounding a desired image, to be possibly trimmed off if desired). The data acquired through 'on-line' calibration, possibly in a 'portion-wise' manner on different target surfaces, can be combined to form a 'complete' calibration image to be analyzed as described in the exemplified context of 'off-line' calibration. Such 'on-line' calibration may prompt the generation of a second correction function.

Print-Bar-Wide Tone Reproduction Function (FIG. 12)—

The DOCI (i.e. that was generated in step S111) is analyzed in step S121 (e.g., by electronic circuitry) to compute a representative bar-wide tone-reproduction function trf_bar_wide for the entire print bar.

Figure 12:
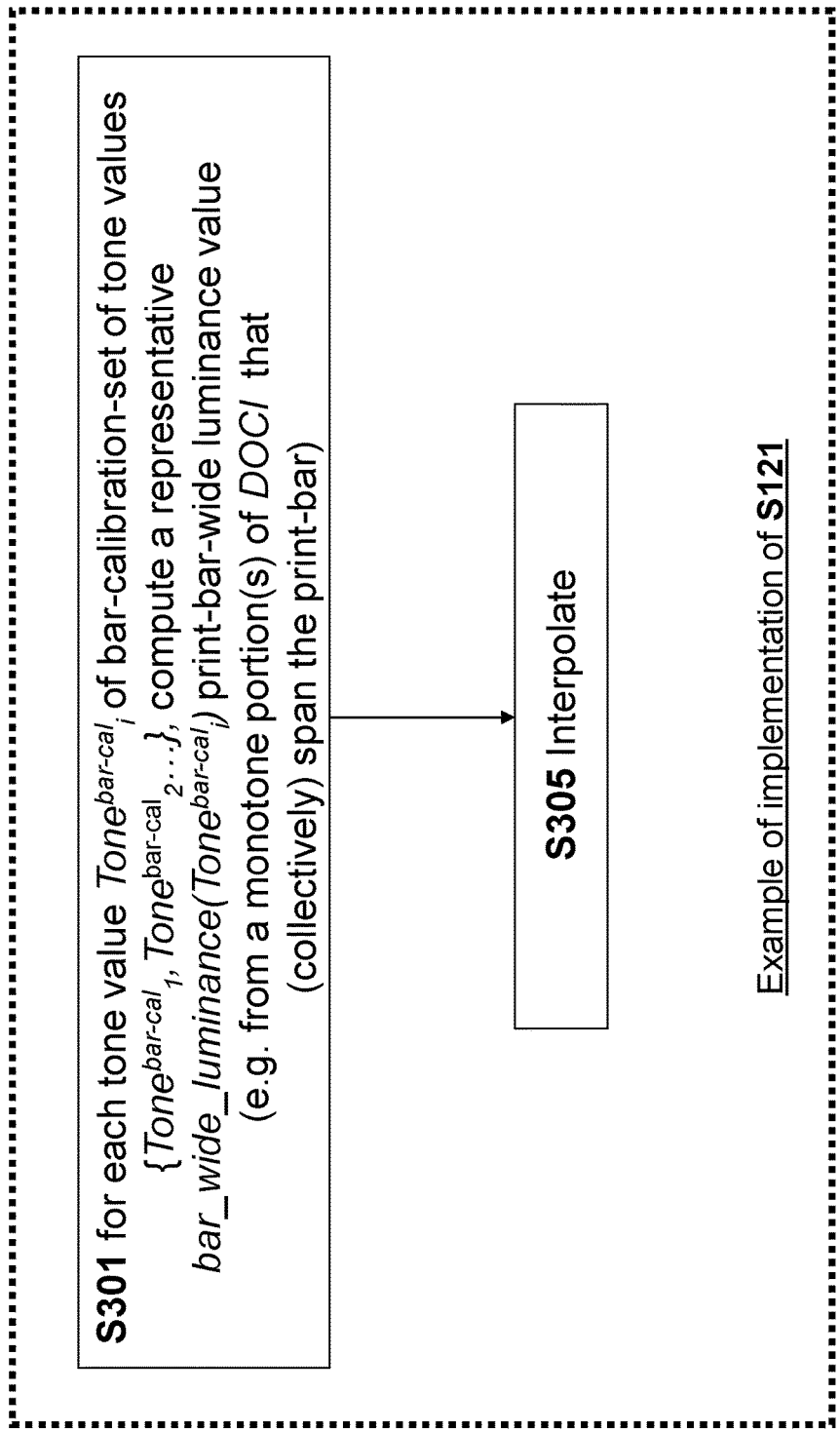

FIG. 12 describes one example of a technique for computing a bar-wide tone-reproduction function trf_bar wide for the entire print bar. Reference is made to step S301 of FIG. 12. For the non-limiting example of FIG. 9A, there are 10 tone values—thus the cardinality of the bar-calibration-set of tone values $\{Tone_1^{bar-cal}, Tone_2^{bar-cal}, \ldots\}$ is 10 where $Tone_i^{bar-cal}$="Tone Value i" (for i=1 . . . 10 where Tone Value 1, Tone Value 2 . . . Tone Value 10 explicitly appear in FIG. 9A). Thus, when the DICI is that presented in FIG. 9A, in step S301 of FIG. 12, 10 ordered pairs are generated from the DOCI derived from this DICI. These 10 ordered pairs are $\{(x_1,y_1),(x_2,y_2) \ldots (x_{10},y_{10})\}$ where for any integer i between 1 and 10, $x_i$=Tone Value i and $y_i$=the average luminance in the $i^{th}$ stripe of the DOCI image derived from the DICI of FIG. 9A. Collectively, these 10 ordered pairs represent the print-bar-wide tone reproduction function.

For the example case of FIG. 9A, each stripe spans the entire image in the cross-print direction and is thus 'print-bar-wide.' Thus, the average luminance value within a particular stripe is one example of a 'print-bar-wide luminance value' of a specific tone value (i.e. the digital input image tone value). Thus, the previous paragraph describes how (for the example of FIG. 9A), a respective representative print-bar-wide luminance value is computed for each tone value (in this example, 10 tone values).

These ordered pairs ($Tone_i^{bar-cal}$, representative_bar_wide_luminance($Tone_i^{bar-cal}$)) (there are 10 of these pairs for the current example) may be said to represent the print-bar-wide tone reproduction function. Nevertheless, the function value is exactly represented only for 10 tone values. However, it is possible to interpolate between (or extrapolate past) these tone values and thus the print-bar-wide tone reproduction function may be computed for any arbitrary tone value from the ordered pair representation of the tone reproduction function.

For the present disclosure, a "representative" value of luminance (or of any other parameter) is some central tendency value (e.g., a first-order statistical moment such as an average, or a median value or any other representative value (e.g., a first statistical moment) known in the pertinent art).

Figure 14:
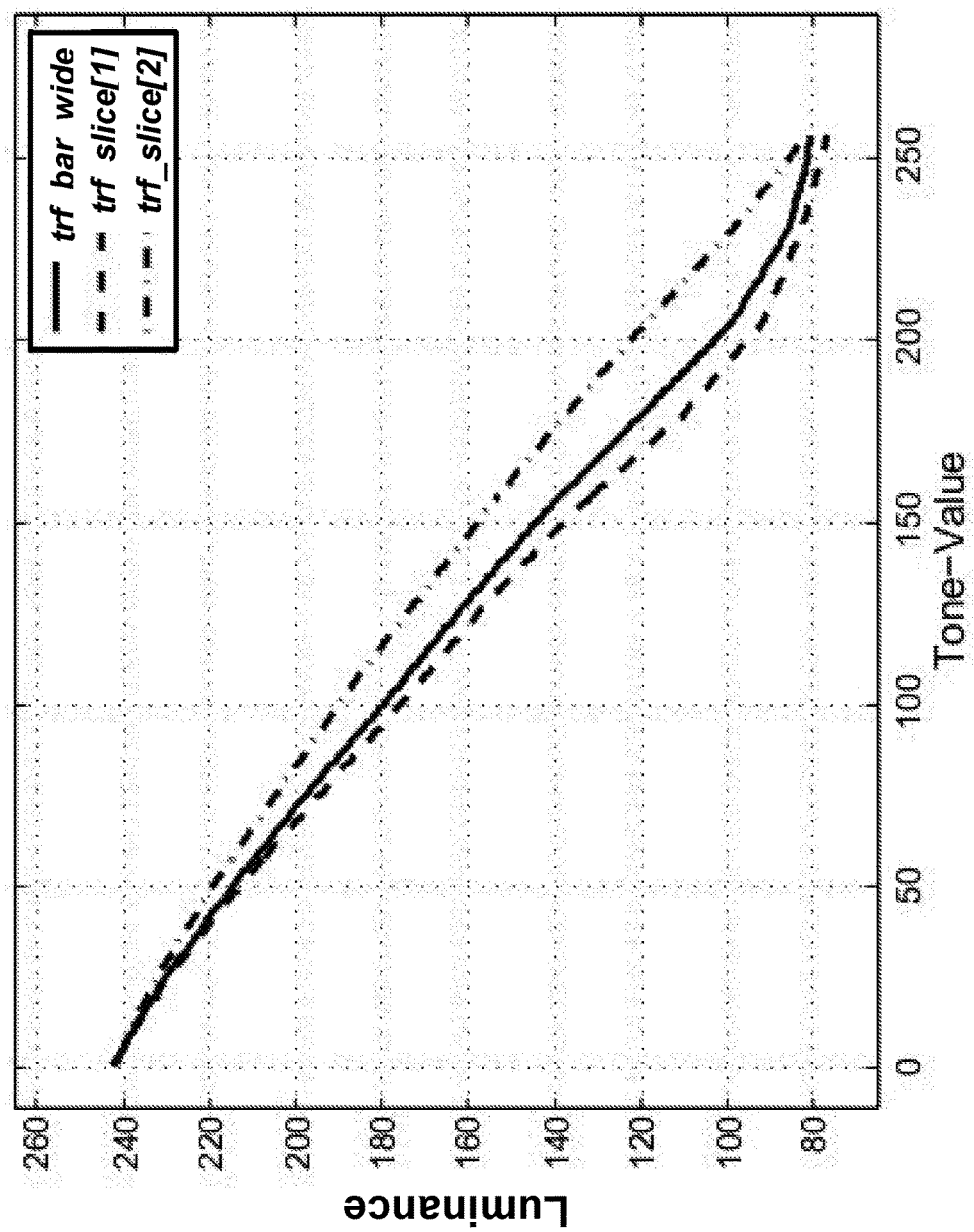
FIG. 14 illustrates both bar-wide and slice-specific TRF functions.

FIG. 14 is a graph of three tone reproduction functions—the tone reproduction function in the solid line is a bar-wide tone-reproduction function of the entire print bar.

Slice-Specific Tone Reproduction Functions (FIG. 13)—

The DOCI (i.e. that was generated in step S111) is analyzed in step S131 (e.g., by electronic circuitry) to compute a plurality of slice-specific tone-reproduction functions specific to each slice. For the non-limiting example of FIG. 9B, (i) 8 slice-specific tone reproduction functions are computed for slices 704A-704H; (ii) each tone reproduction function is represented by 10 ordered pairs (tone value, average luminance value within a tile), where it is possible to interpolate between or extrapolate from the values of the 10 ordered pairs.

Figure 9B:
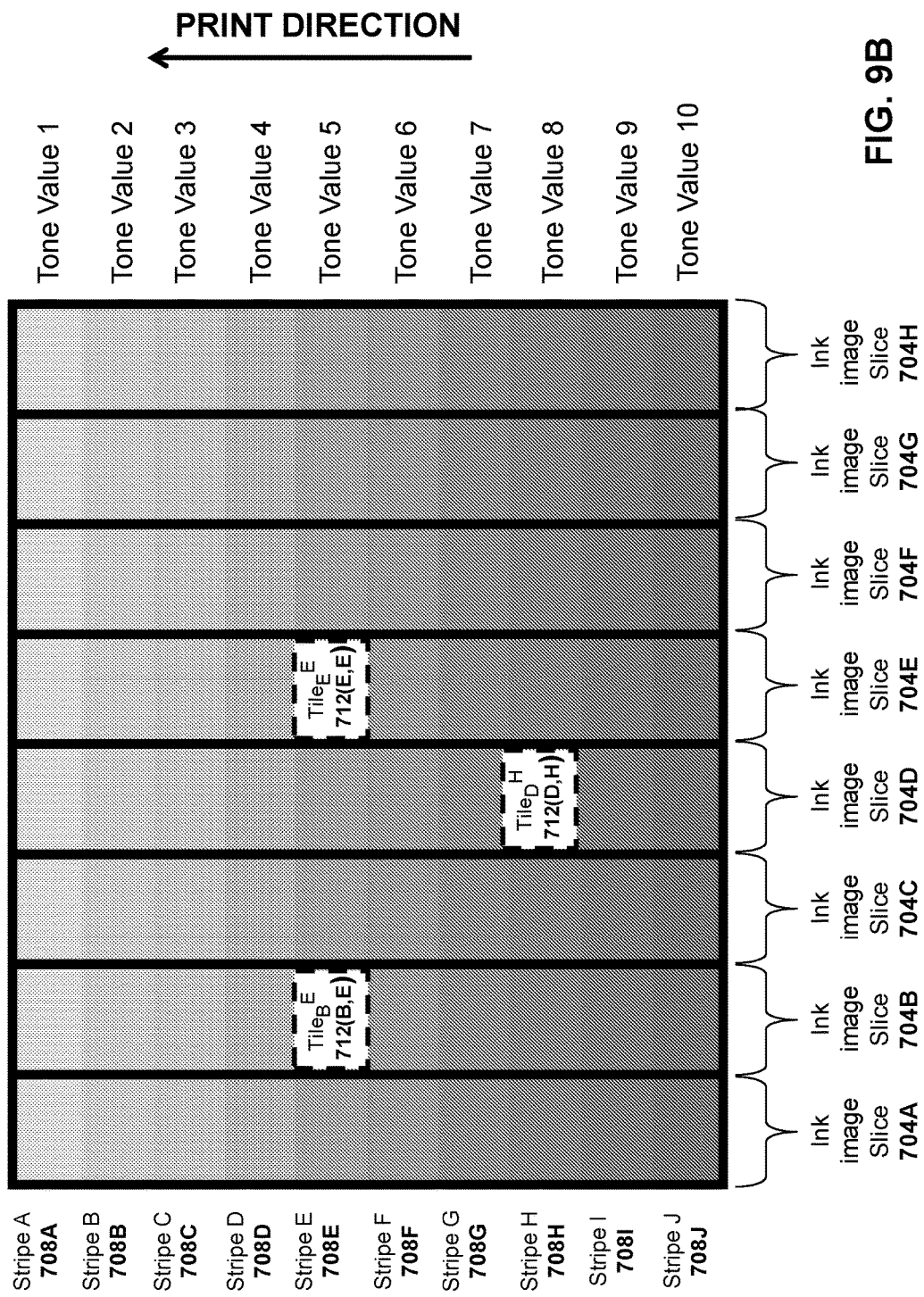
FIG. 9B illustrates slices of the calibration image.

For the non-limiting example of FIG. 9B, 8 slices 704A-704H collectively span the cross-print direction/the print-bar. For each slice slice[j], it is possible to compute a respective slice-specific tone-reproduction function trf_slice [j].

Thus, with reference to the non-limiting example of FIG. 9B, it is noted that the first slice 704A slice[1] of the DOCI can be subdivided into 10 tiles: $TILE_A^A \ldots TILE_A^J$. Each of these tiles is associated with a respective tone value of the 10 tone values in FIG. 9A. For each of these tiles, it is possible to compute a respective tile-averaged luminance value.

Figure 13:
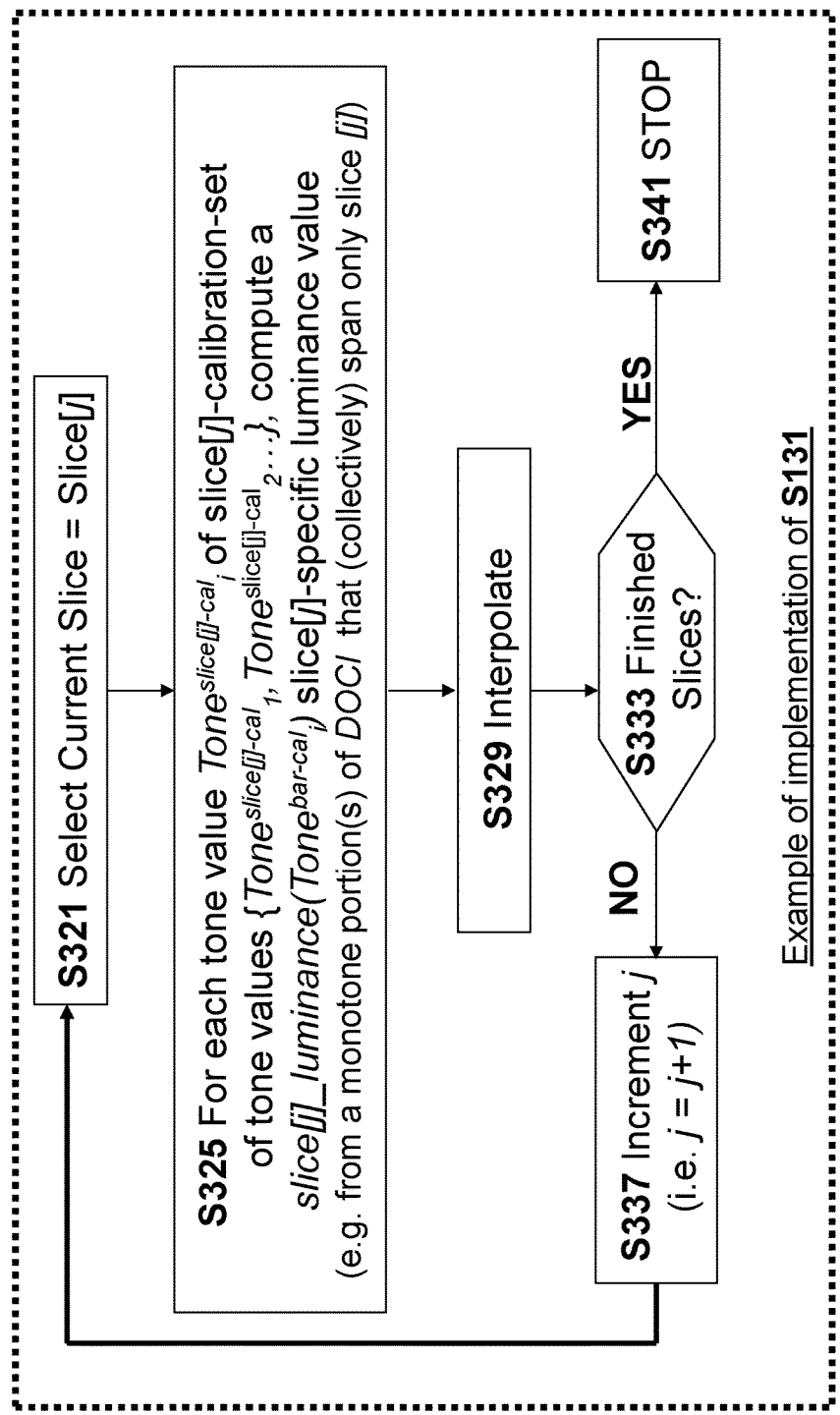

In the present example, the slice[j]-calibration-set of tone values referred to in step S325 of FIG. 13 is the same for each of the slices, and has 10 tone values {Tone Value 1, Tone Value 2 . . . Tone Value 10}, though this is not to be construed as a limitation. In the present example, for each of the slices, the slice[j]-calibration-set of tone values referred to in step S325 of FIG. 13 is also the same as the bar-calibration-set of tone values referred to in FIG. S301 of FIG. 12.

Thus, in the non-limiting example discussed above with reference to FIGS. 9A-9B, it is possible to define 10 ordered pairs first slice 704A slice[1] of the DOCI can—these ordered pairs are {(Tone Value 1, average_luminance ($TILE_A^A$)), (Tone Value 2, average_luminance ($TILE_A^B$)) . . . (Tone Value 10, average_luminance ($TILE_A^J$))} where the function average_luminance is the average luminance within a region of the DOCI (i.e. a region defined by a tile). These 10 ordered pairs serve as a representation of the tone reproduction function $f$ or the first slice 704A.

It is clear that this procedure can be repeated for all of the slices. It is clear that even though the aforementioned procedure for computing the ordered pairs only computes values of the tone reproduction function $f$ or certain tone values, it is possible to interpolate and/or extrapolate for other tone values.

Thus, in the example of FIG. 13, a slice is selected in step S321. In step S325, the slice-specific tone reproduction function is computed for a plurality of discrete tone values, and in step S329 the slice-specific tone reproduction function may be computed for other tone values by interpolation. If this procedure is complete for all slices (step S333), the procedure terminates in step S341. Otherwise, another slice is selected S337 and the procedure is repeated for the additional slice.

FIG. 14 is a graph of three tone reproduction functions—the tone reproduction function in the solid line is a bar-wide tone-reproduction function of the entire print bar, while two of the functions in the broken line are slice-specific tone reproduction functions.

Computing of an Image Correction Function ICF—

In step S141 of FIG. 11, an image correction function ICF is computed from the tone bar-wide and slice-specific tone reproduction functions. One non-limiting implementation of step S141 is described in FIG. 15 which is explained with reference to the example of FIG. 16.

Figure 15:
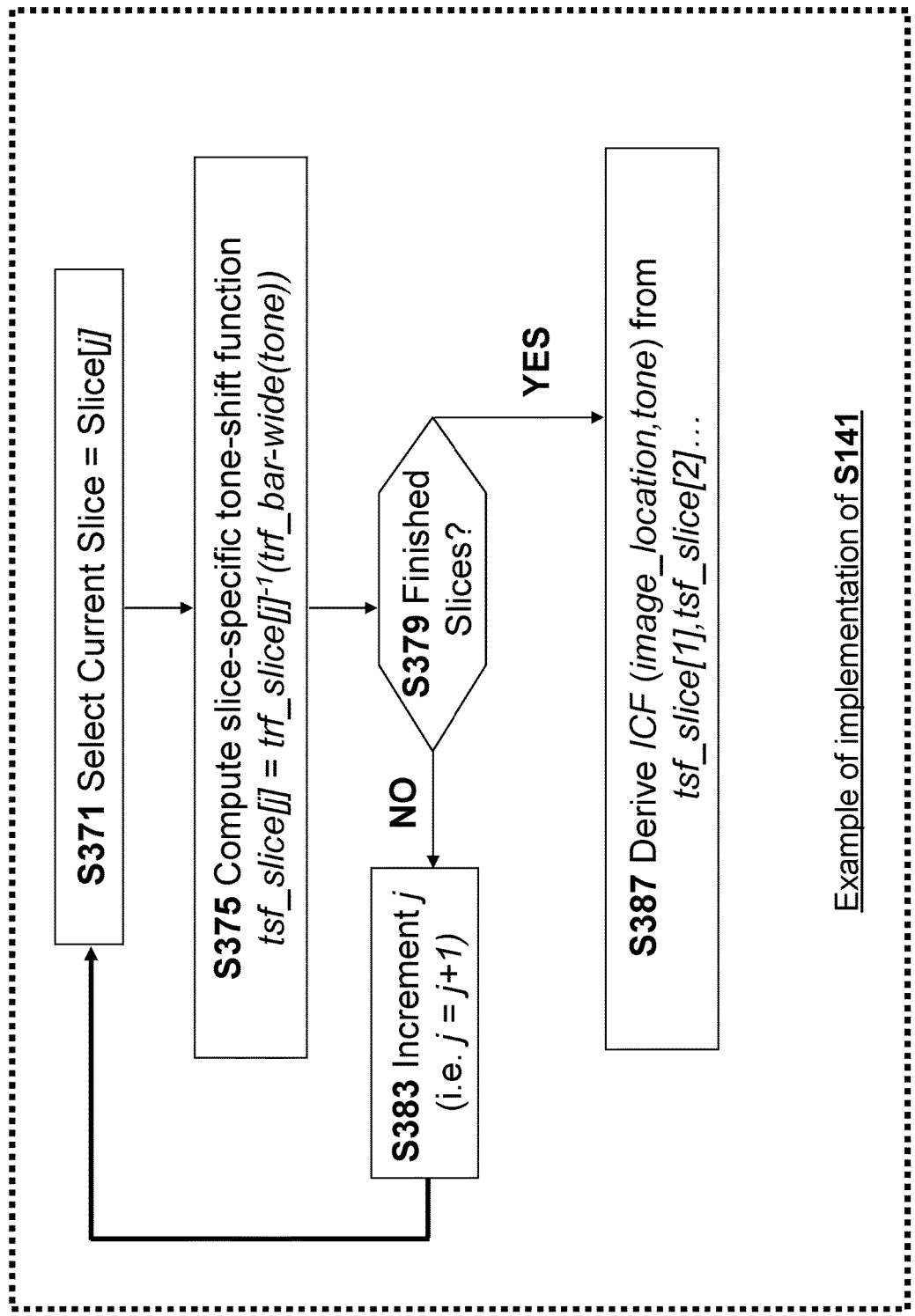

In FIG. 15, an image correction function ICF is computed piecewise for each slice of a plurality of slices. Thus, in step S371, a slice is specified, in step S375 a tone shift function tsf (explained below) is computed for the specified slice, and in steps S379 and S383 the 'current slice' is incremented if required.

The tone shift functions tsf computed in step S375 is now explained.

In the absence of 'non-uniformities,' the luminance value obtained from an input tone value should be independent of location in the cross-print direction, and specified exactly by the print-bar-wide tone reproduction function trf_bar_wide that was computed in step S121 of FIG. 11. In practice, the slice-dependent tone reproduction functions each deviate from the print-bar-wide tone reproduction function trf_bar_wide.

In order to reduce print non-uniformities, it is possible to compute from the slice-dependent tone reproduction functions and the print-bar-wide tone reproduction function trf_bar_wide an image correction function (ICF) which transforms an uncorrected digital image into a corrected digital image. The image correction function assumes that the correction required depends both on tone value as well as position in the cross-print direction—therefore, the functional form of the ICF specified in step S141 of FIG. 11 is ICF(image_location,tone) where image_location requires at least a cross-print-direction position.

Figure 16:
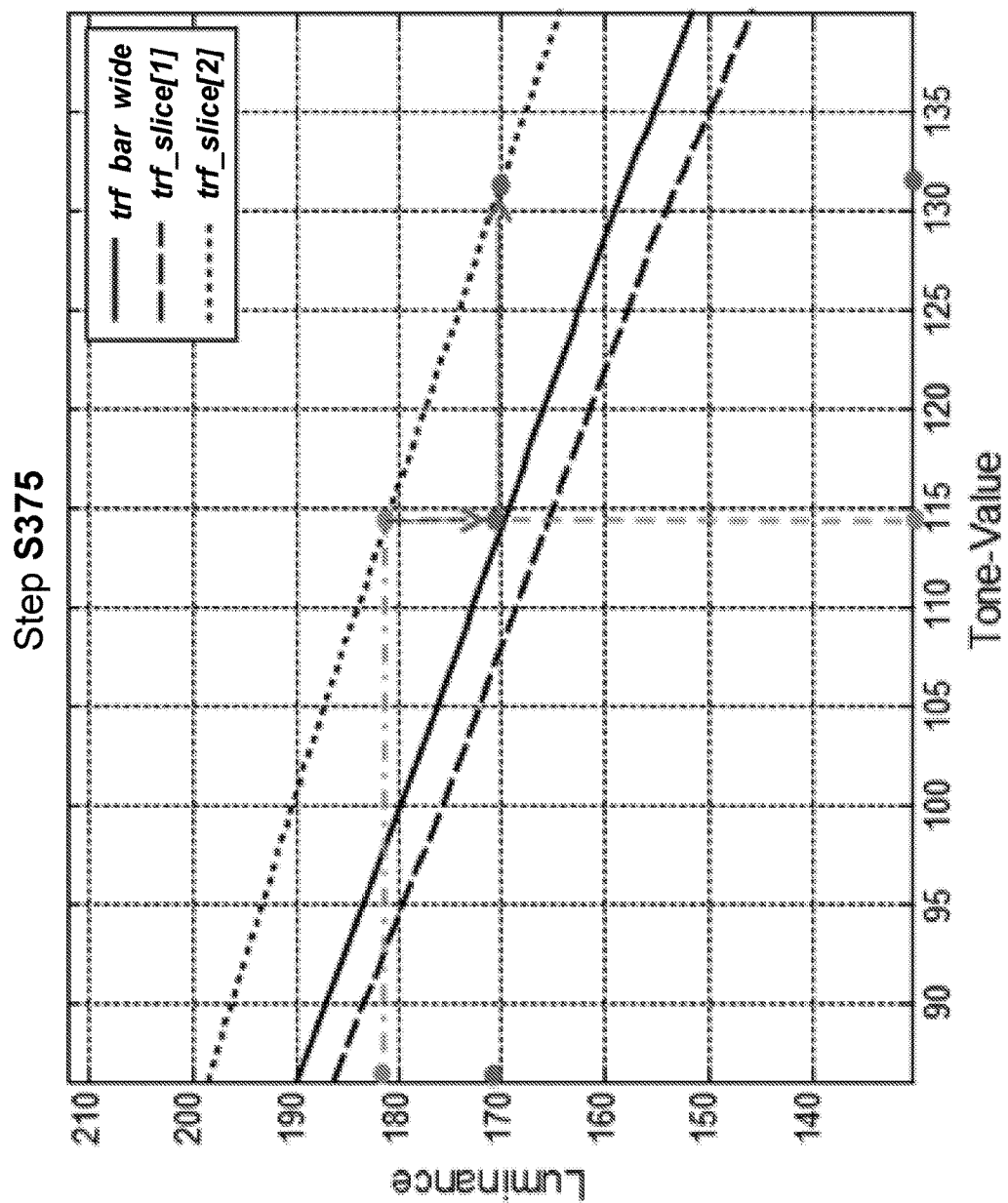
FIG. 16 illustrates tone-shifting according to tone-reproduction functions.

Reference is now made to FIG. 16. In the absence of non-uniformities, a luminance obtained by printing any tone value is given by the print-bar-wide tone reproduction function trf_bar_wide—thus, for the tone-value 114 the luminance is 170. In the absence of non-uniformities, a tone value of 114 in the digital image yields a luminance value of 170 in the ink-image, irrespective of position in the cross-print direction.

However, because of non-uniformities, the tone value required to obtain a luminance of 170 depends on the position in the cross-print direction. Thus, (i) inspection of trf_slice[1] indicates that in slice "1" slice[1], in order to obtain a luminance value of 170 the required tone value is 132 and (ii) inspection of trf_slice[2] indicates that in slice "2" slice[2], in order to obtain a luminance value of 170 the required tone value is 107.

The tone shift functions are slice dependent. For slice 1, the tone shift function tsf_slice[1] should shift a tone value of 115 (which within the corresponding ink image would yield a luminance value of 170 in the absence of non-uniformities) to a tone value of 132. For slice 1, the tone shift function tsf_slice[2] should shift a tone value of 115 (which within the corresponding ink image would yield a luminance value of 170 in the absence of non-uniformities) to a tone value of 107.

This explain why, in step S375, the slice-specific tone-shift function tsf_slice[j] is set equal to trf_slice[j]$^{-1}$ (trf_bar_wide(tone)) where trf is an abbreviation for tone reproduction function, trf_slice[j]$^{-1}$ is the inverse function of the slice-specific tone reproduction function trf_slice[j] computed in step S131 of FIG. 11, and is trf_bar_wide the representative print-bar-wide tone reproduction function computed in step S121 of FIG. 11.

Thus, for slice 1 slice[1], tsf_slice[1] (115)=trf_slice[1]$^{-1}$ (trf_bar_wide(115))=trf_slice[1]$^{-1}$ (170)=132, the desired result.

For slice 2 slice[1], tsf_slice[1] (115)=trf_slice[j]$^{-1}$ (trf_bar_wide(115))=trf_slice[2]$^{-1}$ (170)=107, the desired result.

Based on these tone shift functions, it is possible, in step S387, to derive the image correction function ICF—for example, for a given tone function and position in the cross-print direction the ICF may first require determining the relevant slice relevant_slice corresponding to the position in the cross-print direction, and then applying tsf_slice[relevant_slice] to the tone (i.e. shifting the tone).

Steps S201-211 relate to on-line operation according to the image correction function ICF corrected during the calibration stage.

In step S201, the ICF is applied to a digital image to obtain a corrected digital image which, when printed by the printing system in step S211, is characterized by reduced deviations related to 'image non-uniformities.'

DOCI Data and 'Derivatives Thereof'—

The term DOCI data (or DOCI luminance data) relates to output density values (e.g., luminance values) of the DOCI at location(s) therein. DOCI data of a 'slice' relates to output density values within the slice of the DOCI. It was already noted, above, that 'luminance' is only one example of an output density and whenever the term 'luminance' (or luminance data) appears it may refers to any output density (or data/values of any type of output density) including but not limited to 'luminance.'

For the present disclosure, a 'derivative' of a function $f$ is not limited to its meaning in differential calculus (i.e. $f'$ or $\frac{df}{dx}$), but rather refers to any function 'derived' from the function $f$. By way of example (and referring to FIG. 11), the following functions may be considered a 'derivative' of DOCI data within a slice: (i) tone-reproduction functions as derived from DOCI data of the slice (ii) the tone-shift function as derived from DOCI data of the slice; and (iii) the image correlation function ICF as derived from DOCI of the slice.

The subsequent sections describe 'interpolation' and 'extrapolation.' The examples presented in these sections may relate to interpolations or extrapolations of trf functions or tsf functions or ICF functions on a 'slice'—these interpolations or extrapolations are all examples of interpolating or extrapolating a 'derivative of DOCI data.'

Interpolation and Extrapolation—

In the above examples, the trf_slice functions may be computed for any slice from the luminance of the DOCI within the slice. By way of example, trf_slice[1] may be computed from the luminance of DOCI within slice[1], trf_slice[2] may be computed from the luminance of DOCI within slice[2], and so on. Since a slice of the DOCI is a 'region' of the DOCI, computing the trf function on a slice from luminance data within that slice is an example of computing the trf function from 'regional-internal' data.'

Alternatively or additionally, it is possible to base the value of the trf_slice[i] function (or any slice[i] derivative of trf_slice[i]) on the luminance of regions of the DOCI outside of slice slice[i] (i is a positive integer).

Interpolation: In one example related to interpolation, it is possible to compute the function trf_slice[i] function by the following steps: (i) determining trf_slice[j] function from luminance data within the DOCI(slice[j]) (where j is a positive integer, j<i); (ii) determining trf_slice[k] function from luminance data within the DOCI(slice[k]) (where k is a positive integer, k>i) and (iii) interpolating between the trf_slice[j] function on slice[j] and the function on slice[k] to compute the function on trf_slice[i]. When computing the trf_slice[i], luminance data within DOCI(slice[i]) is considered 'regional-internal' and luminance data from portions of DOCI outside of DOCI(slice[i]) (e.g., in DOCI(slice[j]) and in DOCI(slice[k])) is considered 'region-external.'

Thus, in one example related to FIG. 7A, it is possible to (i) compute the slice-specific trf for slice 1620A from the luminance of the DOCI within slice 1620A; (ii) compute the slice-specific trf for slice 1620C from the luminance of the DOCI within slice 1620C; and (iii) to compute the trf on slice 1620B or at a location therein (i.e. at $NP_4$) by interpolating between (A) the slice-specific trf for slice 1620A and (B) the slice-specific trf for slice 1620C. Thus, in this example, rather than relying on the luminance of the DOCI within slice 1620B it is possible to compute the slice-specific trf for slice 1620B from region-external luminance of the DOCI in slices 1620A and 1620C.

Although in theory it is possible to operate in this manner, this may not be the preferable modus operandi. In practice, it may be preferable to derive trf on slice 1620B from 'region-internal' DOCI luminance data within slice 1620B since this 'region-internal' luminance data typically more accurately reflects printing within the slice 1620B than interpolations from regions that are 'external' to slice 1620B. In this example, luminance data of DOCI from slice 1620B is 'region-internal' with respect to slice 1620B;

luminance data of DOCI from slices 1620A and 1620C are 'region-external' with respect to slice 1620B.

Extrapolation:

In one example related to extrapolation, it is possible to compute the function trf_slice[i] function by to the following steps: (i) determining trf_slice[j] function from the DOCI(slice[j]) (where j is a positive integer, j<i); (ii) determining trf_slice[k] function from the DOCI(slice[k]) and (iii) extrapolating from trf_slice[j] function on slice[j] and the function trf_slice[k] on slice[k] to compute the function on trf_slice[i] on slice[j].

In one example related to FIG. 7A, it is possible to (i) compute the slice-specific trf for slice 1620B from the luminance of the DOCI within slice 1620B; (ii) compute the slice-specific trf for slice 1620C from the luminance of the DOCI within slice 1620C; and (iii) to compute the trf at locations in slice 1620D (i.e. at $NP_8$ and $NP_{10}$) by extrapolating the trf computed from DOCI luminance data in slices 1620B and 1620C.

Computing a Trf from a Combination of Region-Internal and Region-External Luminance Data—

In the preceding paragraphs, it is noted that it is possible to either computer trf from region-internal luminance data of the DOCI or from region-external luminance data of the DOCI (i.e. by extrapolation or interpolation). It is appreciated that these two approaches may be combined—i.e. the trf may be computed by a mathematical combination (e.g., from multiple functions, each weighted by an appropriate weight). For the present disclosure, assigning a 'lesser weight' to a function applies to the case where a smaller non-zero weight is used, or by assigning a 'zero weight'—i.e. not using the function.

Image Correction in Interlace Regions (and Use of Function Extrapolation)—

As discussed above with reference to FIGS. 4 and 7A-7B, (i) some portions of the range of the cross-print direction are exclusive to a 'single print head' (i.e. region 610A is exclusive to Head A, region 610C is exclusive to Head B, region 610E is exclusive to Head C, region 610G is exclusive to Head D), and (ii) some portions of the range of the cross-print direction are print-head 'interlace regions' including nozzles from two neighboring print heads—thus, region 610B includes nozzles from print heads A and B, region 610D includes nozzles from print heads B and C, and region 610F includes nozzles from print heads C and D.

In FIG. 7A, slices 1620D-1620G form the 'mediating' region which mediates between (i) the single-print-head-region exclusive to print head 1604A which is formed by slices 1620A-1620C and (ii) the single-print-head-region exclusive to print head 1604B which is formed by slices 1620H-1620I. In addition, each slice 1620D-1620G is individually an 'interlace region' with respect to print heads 1604A, 1604B.

Within the mediating slice (i.e. formed by slices 1620D-1620G), it is possible to compute a slice-specific trf (or a slice-specific derivative thereof) function (hereinafter a "trf-related function" trf_related) as follows:

A) "Print head 1604A-nozzle locations" within this mediating slice—some locations within the mediating slice (i.e. formed by slices 1620D-1620G) are occupied by nozzles from print head 1604A—as shown in FIG. 7A, these locations are $NP_8$, $NP_{10}$, $NP_{12}$, $NP_{14}$ and $NP_{16}$). At these print head 1604A-nozzle locations, the trf-related function is computed from "region-external" DOCI luminance data (i.e. DOCI luminance data of slices 1620A-1620C) rather than by relying only on region-internal DOCI luminance data of the mediating slice formed by slices 1620D-1620G. In particular, it is possible to (i) compute the slice-specific trf_related function $f$ or slices 1620A-1620C (i.e. which form the single-print-head region exclusive to print head 1604A) from DOCI luminance data of slices 1620A-1620C; and (ii) extrapolate the trf_related function into the mediating slice formed by slices 1620D-1620G and (iii) employ this extrapolation of trf_related function at locations $NP_8$, $NP_{10}$, $NP_{12}$, $NP_{14}$ and $NP_{16}$—i.e. the locations in the mediating slice formed by slices 1620D-1620G which are occupied by nozzles from print head 1604A.

B) "Print head 1604B-nozzle locations" within this mediating slice—some locations within the mediating slice (i.e. formed by slices 1620D-1620G) are occupied by nozzles from print head 1604B—as shown in FIG. 7A, these locations are $NP_9$, $NP_{11}$, $NP_{13}$, $NP_{15}$ and $NP_{17}$). At these print head 1604B-nozzle locations, the trf-related function is computed from "region-external" DOCI luminance data (i.e. DOCI luminance data of slices 1620H-1620I) rather than by relying only on region-internal DOCI luminance data of the mediating slice formed by slices 1620D-1620G. In particular, it is possible to (i) compute the slice-specific trf_related function $f$ or slices 1620H-1620I (i.e. which form the single-print-head region exclusive to print head 1604B) from DOCI luminance data of slices 1620H-1620I; and (ii) extrapolate the trf_related function into the mediating slice formed by slices 1620D-1620G and (iii) employ this extrapolation of trf_related function at locations $NP_9$, $NP_{11}$, $NP_{13}$, $NP_{15}$ and $NP_{17}$—i.e. the locations in mediating slice formed by slices 1620D-1620G are occupied by nozzles from print head 1604B.

Figure 17A:
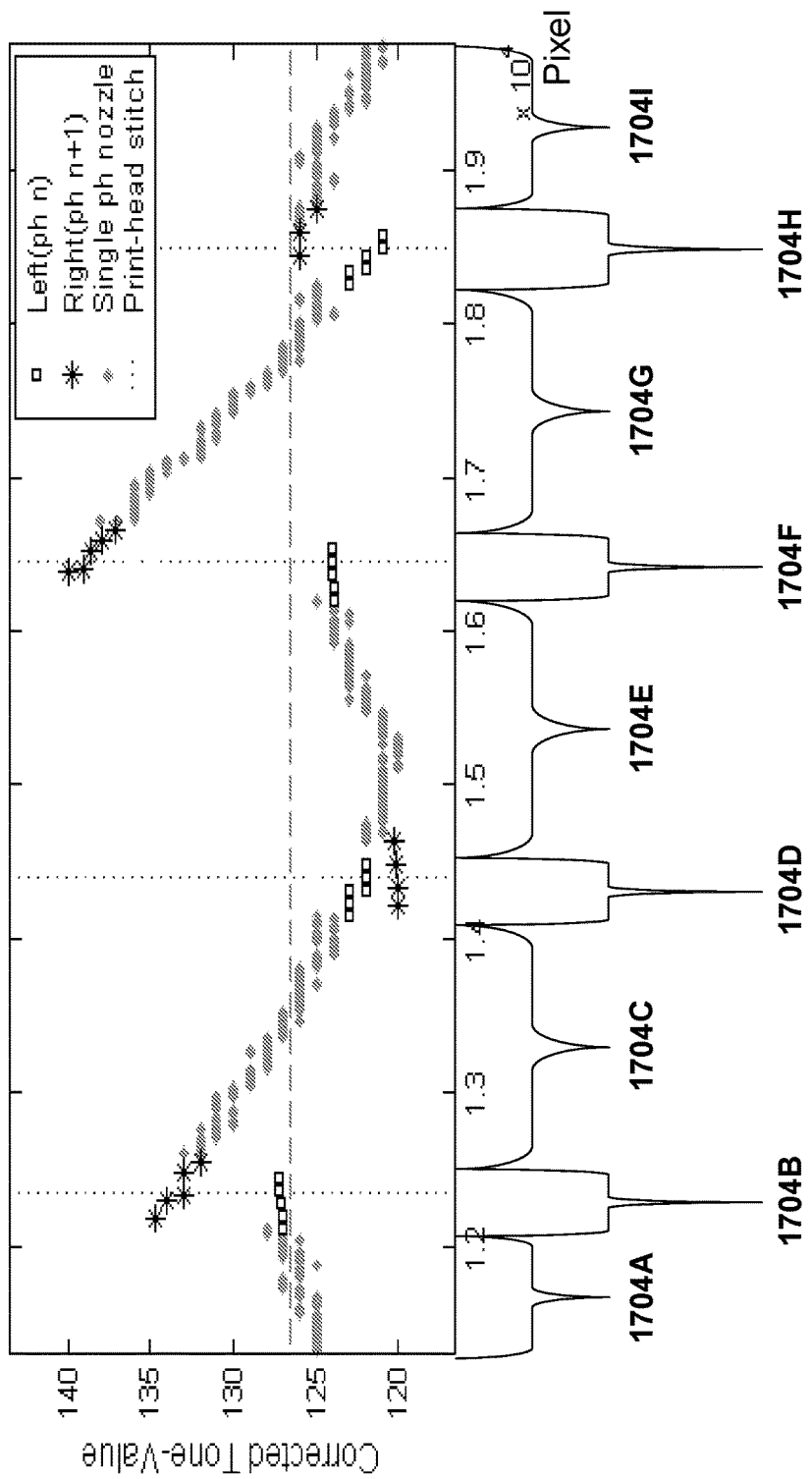
FIGS. 17A-17B and 18 illustrate corrected tone-value as a function of position in the cross-print direction for one example.
Figure 17B:
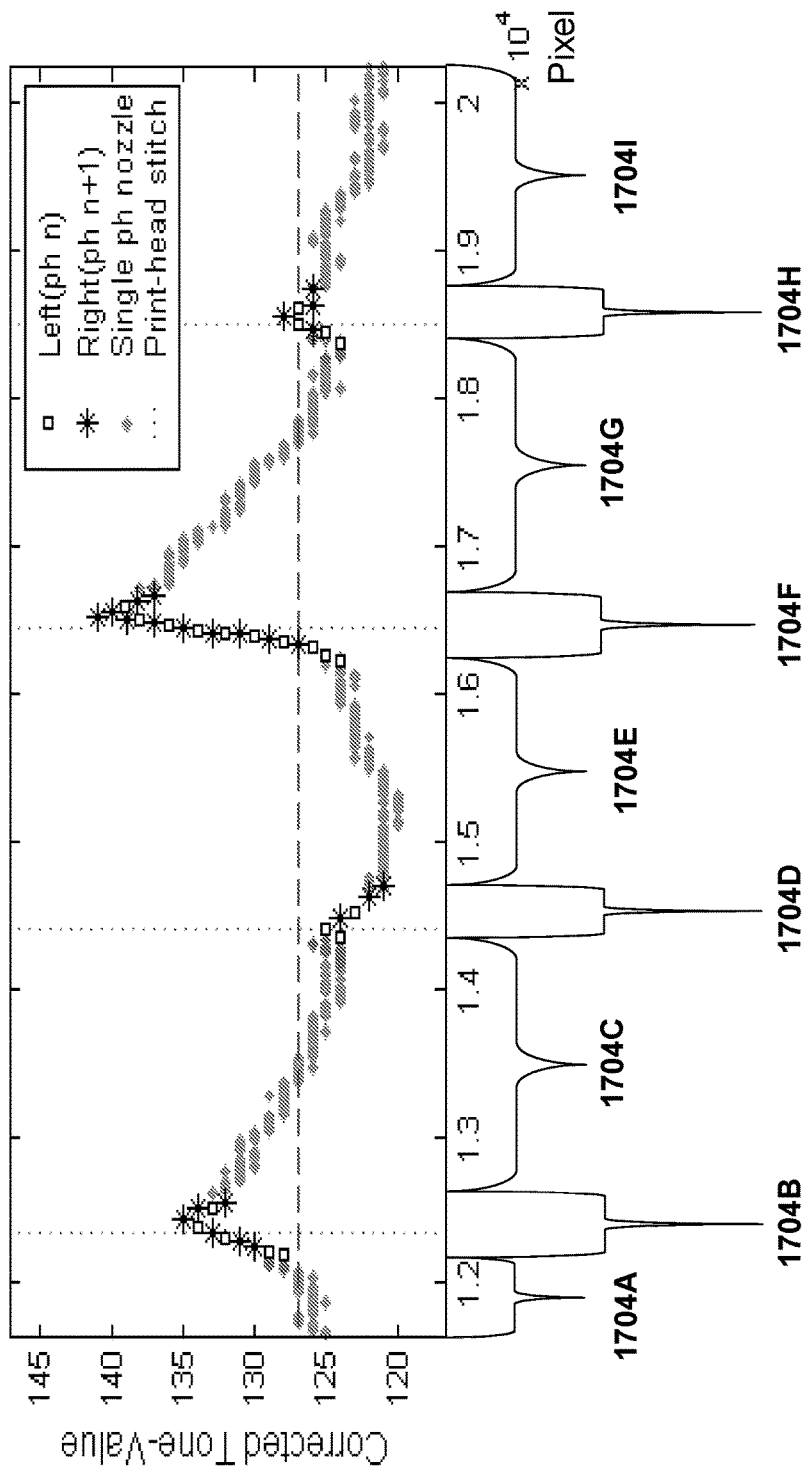
Figure 18:
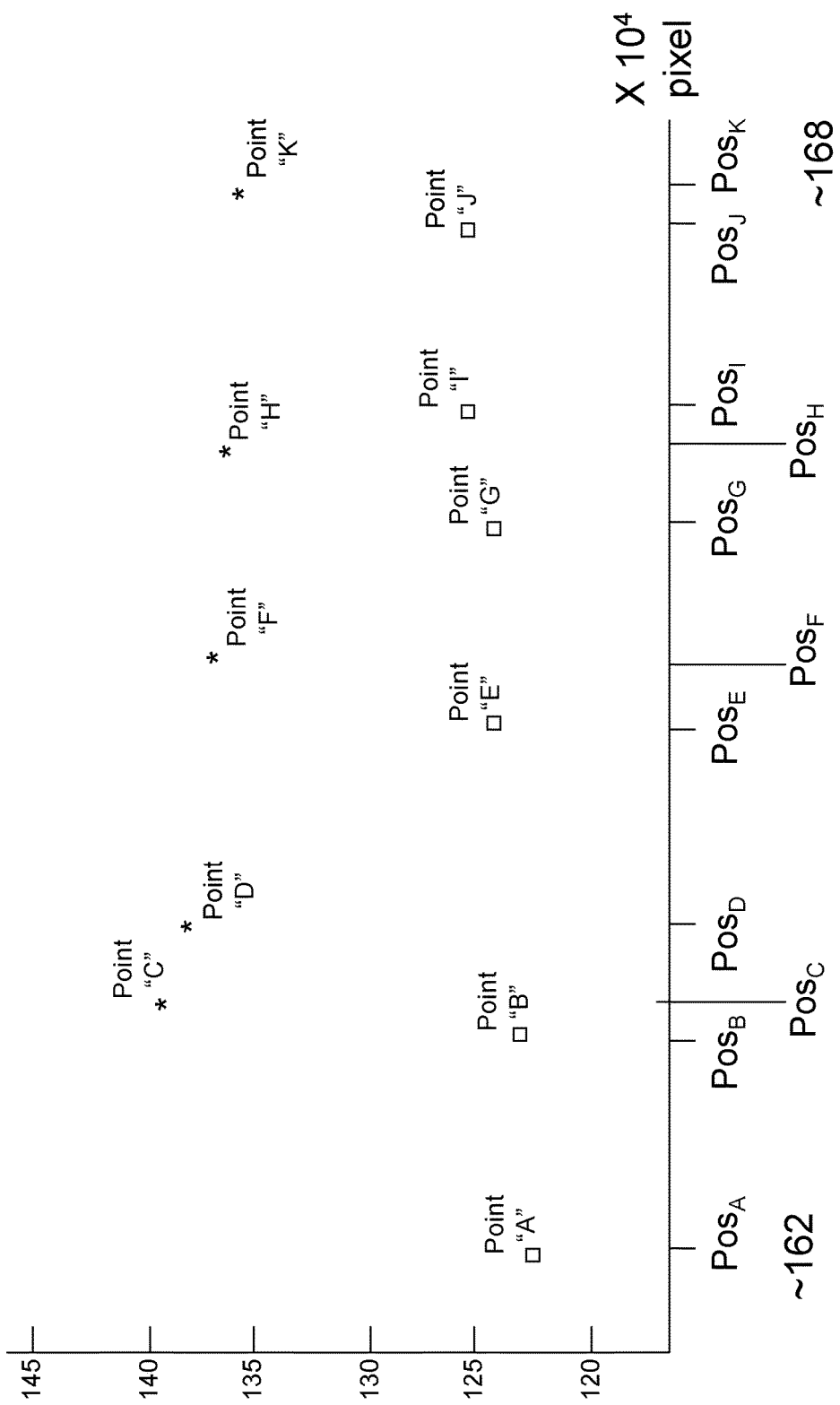

A Discussion of FIGS. 17A-17B and 18

Reference is now made to FIGS. 17A-17B which illustrate, for a tone value of about 128, the 'corrected tone value' for different locations in the cross-print direction according to Technique A and Technique B. Techniques A and B are discussed below—presently, Technique A is presently preferred though in other embodiments, Technique B may be employed.

In FIGS. 17A-17B, the corrected tone value as a function of position in the cross-print direction is illustrated. The corrected tone value is the tsf(tone value) where (as noted above) tsf is an abbreviation for tone shift function. Thus, a 'corrected tone value' of 128 indicates that no shift is required.

In the examples of FIGS. 17A-17B, 7 slices are illustrated—slices 1704A-1704I. Slices 1704A, 1704C, 1704E, 1704G and 1704I are single-print-head slices and slices 1704B, 1704D, 1704F and 1704H are interlace slices which mediate between neighboring single-print-head slices. Thus, slice 1704B mediates between neighboring slices 1704A and 1704C, slice 1704D mediates between neighboring slices 1704C and 1704E, and so on. It is clear from FIGS. 17A-17B that the ink image may be divided into alternating single-print-head slices and interlace or stitch slices.

In this example, within the single-print head slice 1704A are the nozzle positions only of nozzles of print head PH_A, within the single-print head slice 1704C are the nozzle positions only of nozzles of print head PH_C (in this example, there is no print head labeled 'PH_B'), and so on. Within mediating region 1704B are nozzle positions of both print head PH_A and PH_C (i.e. interlaced), within mediating region 1704D are nozzle positions of both print head PH_C and PH_E (i.e. interlaced) and so-on.

Within the single-print head slices 1704A, 1704C, 1704E, 1704G and 1704I, the tone-shift function (i.e. illustrated by the 'corrected tone' value) and the ICF are computed primarily from DOCI luminance data within the respective single-print head slice. Thus, the tone-shift function (and the derived ICF) within 1704A is computed primarily from DOCI data of the slice 1704A, the tone-shift function (and the derived ICF) within 1704C is computed primarily from DOCI data of the slice 1704C, and so on. The interlace slices 1704B, 1704D, 1704F and 1704H are handled differently. For example, within the range of slice 1704B, instead of computing the tone-shift function (and the derived ICF) from the 'region-internal' DOCI data of slice 1704B, it is possible to rely primarily on extrapolation of DOCI data (or a derivative thereof) from neighboring slices 1704A, 1704C—the DOCI data of slices 1704A, 1704C is 'region external' with respect to slice 1704B.

There are two techniques to compute corrected tone value or ICF within mediating slice (e.g., interlace slices) from region external data that are set forth respectively in FIGS. 17A and 17B. Consider mediating slice 1704B which mediates between slices 1704A and 1704C. According to 'Technique A' (illustrated in FIG. 17A) within mediating slice 1704B (e.g., a slice that is not a single print-head slice like 1704A and 1704C—e.g., slice 1704B is an interlacing or stitch slice), there are two extrapolation functions—a first extrapolation function from one of the neighboring single-print-head slices 1704A (having a "left position" relative to mediating slice 1704B) and a second extrapolation function from the other of the neighboring single-print-head slices 1704C (having a "right position" relative to mediating slice 1704B). In FIG. 17A, 'left extrapolations' (i.e. extrapolations from the left neighbor of a mediating or interlace slice—for mediating slice 1704B this refers to extrapolation from single-print-head slice 1704A) are illustrated by the 'square' symbol, and 'right extrapolations' (i.e. extrapolations from the right neighbor of a mediating or interlace slice—for mediating slice 1704B this refers to extrapolation from single-print-head slice 1704C) are illustrated by the 'asterisk' symbol.

This is true for all mediating slices illustrated therein (i.e. 1704B, 1704D, 1704F and 1704H).

Thus, according to Technique A of FIG. 17A, within each mediating slice two extrapolation functions co-exist—the first illustrated by squares and the second illustrated by asterisks. In contrast, according to Technique B of FIG. 17B, within each mediating slice the function (i,e. tsf or ICF) is computed by interpolating between the left neighboring slice and the right-neighboring slice.

Consider slice 1704F. According to Technique B, the corrected tone value (designated by the asterisks) within 1704F is, roughly speaking, approximated by a line between (1.65, 125) and (1.71, 140) and is monotonically increasing on most of the slice 1704F (i.e. most of the portion between about 1.65 and $1.71 \times 10^4$ pixel of the X-axis. In contrast, according to Technique A, the corrected tone value 'jumps' between (i) values of a 'first approximation function' appropriate for 'print head A' nozzles (i.e. all values below a luminance of about 125—this is an extrapolation only of the value of the corrected tone value function on slice 1704E without influence from slice 1704G) and is illustrated in by hollow squares; and (ii) values of a 'second approximation function' appropriate for 'print head B' nozzles (i.e. all values above a luminance of about 135—this is an extrapolation only of the value of the corrected tone value function on slice 1704G without influence from slice 1704E) and is illustrated in by asterisks.

Thus, in the example of FIG. 17A (Technique A), no points in the slice 1704F are approximated by corrected tone values between 125 and 135—this is in contrast to the example of FIG. 17B (Technique B) where a substantial majority of positions within slice 1704F are assigned corrected tone values between 125 and 135.

FIG. 18 illustrates the function of FIG. 17A (i.e. computed according to 'Technique A') within slice 1704F for 10 points. Each point of FIG. 18 is an ordered pair (x,y) where x is position in the cross-print direction and y is the corrected tone value. The points of FIG. 8 are thus ($Pos_A$, corrected_tone_value($Pos_A$)), ($Pos_B$, corrected_tone_value($Pos_B$)), and so on. The positions $Pos_A$, $Pos_B$, $Pos_E$, $Pos_G$, $Pos_I$ and $Pos_J$ (which define x values of points A, B, E, G, I and J) all correspond to positions of a nozzle of print-head PH_E. The positions $Pos_C$, $Pos_D$, $Pos_F$, $Pos_H$ and $Pos_K$ (which define x values of points C, D, F, H and K) all correspond to positions of a nozzle of print-head PH_G.

Within slice 1704F the corrected tone-value function is thus computed as follows:

I) At positions $Pos_A$, $Pos_B$, $Pos_E$, $Pos_G$, $Pos_I$ and $Pos_J$ (i.e. all corresponding to positions of a nozzle of print-head PH_E), the corrected tone-value function is computed by extrapolating the 'corrected tone-value function' of slice 1704E;

II) At positions $Pos_C$, $Pos_D$, $Pos_F$, $Pos_H$ and $Pos_K$ (i.e. all corresponding to positions of a nozzle of print-head PH_G), the corrected tone-value function (i.e. and hence the ICF) is computed by extrapolating the 'corrected tone-value function' of slice 1704G.

The technique described for computing the corrected tone value (and hence ICF) described (and exemplified) with respect to FIGS. 17A-17B and 18 has the following features (and in different embodiments, any combination of these features is provided including combinations explicitly listed or any other combination even those not explicitly listed):

First Feature Set:

In some embodiments, Features A-C are provided together (though this is not a requirement).

Feature A—The printing system is configured so that images produced by the print-bar thereof are dividable into alternating single-print-head slices and interlace slices—i.e. moving from left to right one alternatively passes through single-print-head slices and interlace slices.

Feature B—Within the single-print-head slices (i.e. within slices 1704A, 1704C, 1704E, 1704G and 1704I), the ICF is derived primarily from region-internal DOCI data. In the example of FIGS. 17A-17B: within slice 1704A the ICF is derived primarily from DOCI data of slice 1704A, within slice 1704C the ICF is derived primarily from DOCI data of slice 1704C, and so on.

Feature C—Within the interlace slices (i.e. within slices 1704B, 1704D, 1704F and 1704H), the ICF is derived primarily from extrapolation of region-external DOCI data. Within slice 1704B the ICF is derived primarily from extrapolation of DOCI data from region-external DOCI data (i.e. DOCI data from slices 1704A and/or 1704C is 'region-external' with respect to slice 1704B), within slice 1704D the ICF is derived primarily from extrapolation of DOCI data from region-external DOCI data (i.e. DOCI data from slices 1704C and/or 1704E is 'region-external' with respect to slice 1704D), and so on.

Second Feature Set:

In some embodiments, Features D-G are provided together (though this is not a requirement).

Feature D—The printing system is configured so that images produced by the print-bar thereof comprise first 1704E and second 1704G distinct single-print-head slices and a mediating slice 1704F (e.g., this also may be an 'interlacing' slice) therebetween—for example, slices 1704E and 1704G are respectively exclusive for first PH_E and second PH_G print-head.

Feature E—The mediating slice 1704F includes first {$Pos_A$, $Pos_B$, $Pos_E$, $Pos_G$, $Pos_I$ and $Pos_J$} and second {$Pos_C$, $Pos_D$, $Pos_F$, $Pos_H$ and $Pos_K$} sets of positions interlaced therein, positions of the first and second set respectively corresponding to nozzle positions for nozzles of the first PH_E and second PH_G print heads.

Feature F—The deriving of the ICF includes computing first (illustrated by hollow squares) and second (illustrated by asterisks) extrapolation functions respectively describing extrapolation from the first 1704E and second 1704G single-print-head slices into the mediating region 1704F of DOCI data, or a derivative thereof—in this case the 'derivative' of the DOCI data is the corrected tone-value function which is derived from DOCI data (see, for example, FIGS. 11 and 15).

Feature G—Within the mediating region 1704F, (A) at positions { $Pos_A$, $Pos_B$, $Pos_E$, $Pos_G$, $Pos_I$ and $Pos_J$} of the first set, the ICF is derived primarily from the first extrapolation function (illustrated by hollow squares) and (B) at positions { $Pos_C$, $Pos_D$, $Pos_F$, $Pos_H$ and $Pos_K$} of the second set, the ICF is derived primarily from the second extrapolation function (illustrated by the asterisks)

Third Feature Set:

In some embodiments, Features H-J are provided together (though this is not a requirement).

Feature H—The printing system is configured so that images produced by the print-bar thereof comprise first 1704E and second 1704G of single-print-head slices (e.g., distinct, non-overlapping slices) and a slice 1704F therebetween (i.e. a mediating slice—e.g., an interlace slice), the first and second single-print-head slices being respectively exclusive for first PH_E and second PH_G print-heads.

Feature I—The interlace 1704F slice includes first {$Pos_A$, $Pos_B$, $Pos_E$, $Pos_G$, $Pos_I$ and $Pos_J$} and second {$Pos_C$, $Pos_D$, $Pos_F$, $Pos_H$ and $Pos_K$} sets of positions interlaced therein, positions of the first and second set respectively corresponding to nozzle positions for nozzles of the first PH_E and second PH_G print heads Feature J—Within the interlace 1704F region, (i) the ICF is computed by determining if a position in the mediating region corresponds to a nozzle position of the first print-head (e.g., if a position within 1704F corresponds to a nozzle-position of a nozzle of print head PH_E, the 'hollow square' extrapolation from slice 1704E is used) or of the second print-head (e.g., if a position within 1704F corresponds to a nozzle-position of a nozzle of print head PH_G, the 'asterisk' extrapolation from slice 1704G is used) print-head and the ICF is computed according to the results of the determining (i.e. the determining of the 'print head' source of a nozzle position within interlace region 1704G).

Fourth Feature Set:

In some embodiments, Features H and K-N are provided together (though this is not a requirement).

Feature K—The mediating region 1704F includes a first $P_1$ and a second $P_2$ positions (e.g., in FIG. 18, the 'first' position can be $Pos_D$ and the 'second' position can be $Pos_E$), the first position $P_1$ being closer than the second $P_2$ position to the first single-print-head slice 1704E (e.g., in FIG. 18, $Pos_D$ is closer to slice 1704E than $Pos_E$ is to slice 1704E), the second position $P_2$ being closer to the second single-print-head slice 1704G than the first position $P_1$ is to the second single-print-head slice (e.g., in FIG. 18, $Pos_E$ is closer than $Pos_D$ to slice 1704G).

Feature L—The deriving of the ICF includes computing first and second extrapolation functions (e.g., the first extrapolation function being illustrated in FIG. 18 by hollow squares and the second extrapolation function being illustrated by asterisks) respectively describing extrapolation from the first 1704E and second 1704G single-print-head slices into the mediating region 1704G of DOCI data, or a derivative thereof (i.e. a derivative of the DOCI data—e.g., corrected-tone value function).

Feature M—When computing ICF for the first position, a greater weight is assigned to the second extrapolation function than to the first extrapolation function—e.g., when computing the ICF for $Pos_D$ of FIG. 18, a greater weight is assigned to extrapolation from slice 1704G (i.e. asterisks) than to extrapolation from slice 1704E (i.e. hollow squares).

Feature N—When computing ICF for the second position, a greater weight is assigned to the first extrapolation function than to the second extrapolation function—e.g., when computing the ICF for $Pos_E$ of FIG. 18, a greater weight is assigned to extrapolation from slice 1704E (i.e. hollow squares) than to extrapolation from slice 1704G (i.e. asterisks).

Figure 19:
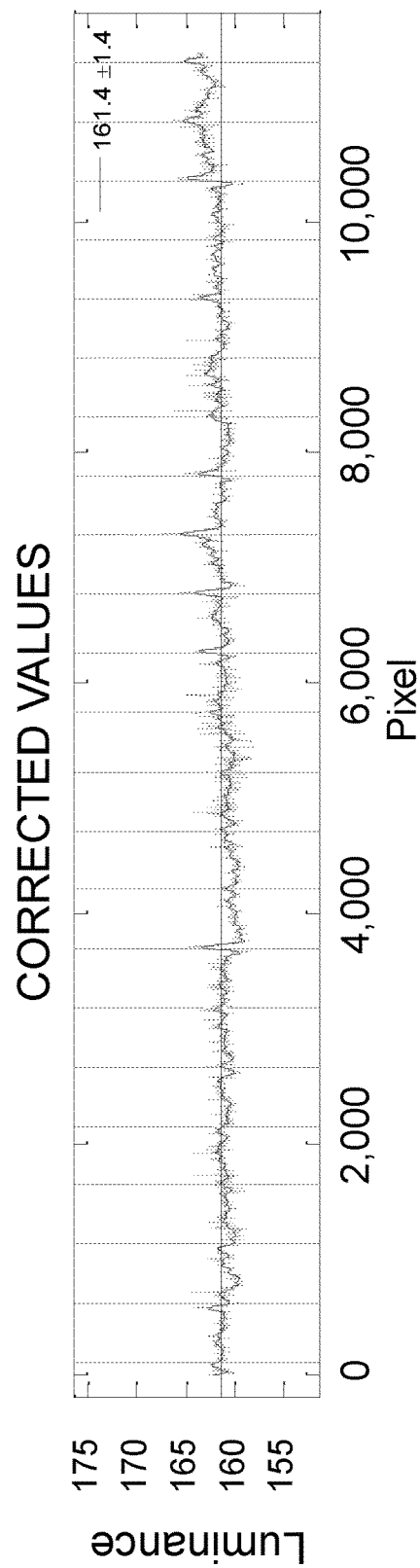
FIG. 19 illustrates luminance as a function position in the cross-print direction for the case of a uniform tone value for the case where the image of FIG. 10 is corrected.

A Discussion of FIG. 19

As noted above, FIG. 10 illustrates (according to one example) for an ink image on a printing 'target surface' (i.e. substrate or ITM) the luminance as a function of cross-print-direction position for an example stripe having a tone-value and/or 'intended luminance' of about 158.0. Due to non-uniformity effects, the luminance is not, in fact, constant, but rather fluctuates as a function of position in the cross-print-direction, as shown in FIG. 10.

In contrast, FIG. 19 illustrates (according to one example) the luminance as a function of cross-print-direction position when instead of printing the uncorrected digital input image, the digital input image is first corrected according to teachings disclosed herein. In contrast to FIG. 10 wherein the standard deviation luminance (i.e. indicating fluctuations around a mean) is 3.3 (or around 2.1%), in FIG. 19 the standard deviation is 1.4 (or less than 1%).

It is to be understood that the methods above described and exemplified for any given ink color of a printing system, can be repeated for each additional ink color in use in the system being considered.

Figure 2B:
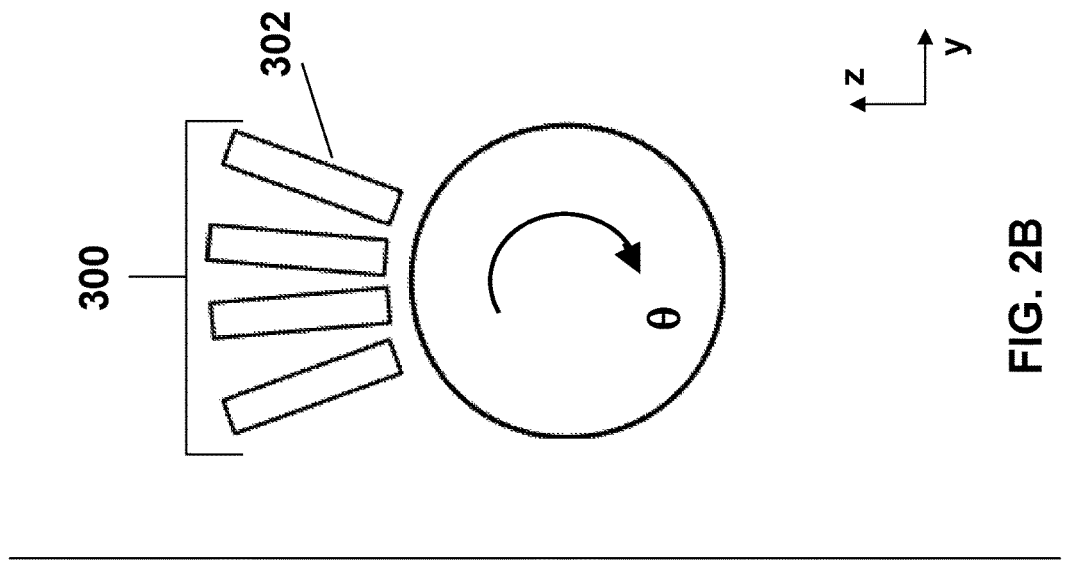
Figure 2A:
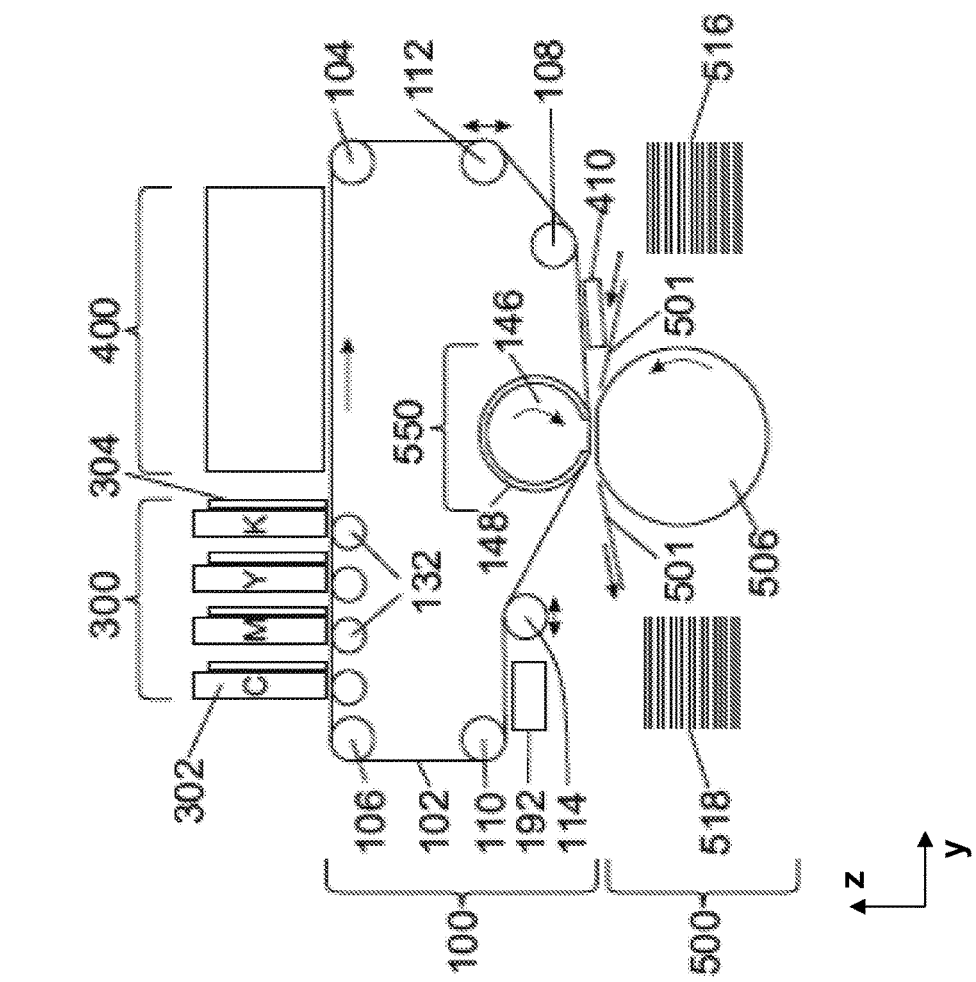

Additional Discussion About FIGS. 1A and 2A-2B

The printing systems schematically illustrated in FIGS. 1 and 2 essentially includes three separate and mutually interacting systems, namely a blanket support system 100, an image forming system 300 above the blanket system 100, and a substrate transport system 500 below the blanket system 100. While circulating in a loop, the blanket passes through various stations including a drying station 400 and at least one impression station 550. Though the below description is provided in the context of the intermediate transfer member being an endless flexible belt, the present invention is equally applicable to printing systems wherein the intermediate transfer member is a drum (schematically illustrated in FIG. 3), the specific designs of the various stations being accordingly adapted.

The blanket system 100 includes an endless belt or blanket 102 that acts as an intermediate transfer member (ITM) and is guided over two or more rollers. Such rollers are illustrated in FIG. 1A as elements 104 and 106, whereas FIG. 2A displays two additional such blanket conveying rollers as 108 and 110. One or more guiding roller is connected to a motor, such that the rotation of the roller is able to displace the blanket in the desired direction, and such cylinder may be referred to as a driving roller. As used herein, the term "printing direction" means a direction from the image forming station where printing heads apply ink to outer surface of the ITM towards the location of the impression station, where the ink image is ultimately transferred to the printing substrate. In FIGS. 1 and 2, the printing direction is illustrated as clockwise.

Though not illustrated in the Figures, the blanket can have multiple layers to impart desired properties to the transfer member. Thus in addition to an outer layer receiving the ink image and having suitable release properties, hence also called the release layer, the transfer member may include in its underlying body any one of a reinforcement layer (e.g., a fabric) to provide desired mechanical characteristics (e.g., resistance to stretching), a compressible layer so that the blanket or the drum surface can conform to the printing substrate during transfer, a conformational layer to provide to the surface of the release layer sufficient conformability toward the topography of a substrate surface, and various other layers to achieve any desired friction, thermal and electrical properties or adhesion/connection between any such layers. When the body of the transfer member comprises a compressible layer, the blanket can be looped to form what can be referred to hereinafter as a "thick belt". Alternatively, when the body is substantially devoid of a compressible layer, the resulting structure is said to form a "thin belt". FIG. 1A illustrates a printing system suitable for use with a "thick belt", whereas FIG. 2A illustrates a printing system suitable for a "thin belt".

Independently of exact architecture of the printing system, an image made up of droplets of an aqueous ink is applied by image forming system 300 to an upper run of blanket 102 at a location referred herein as the image forming station. In this context, the term "run" is used to mean a length or segment of the blanket between any two given rollers over which the blanket is guided. The image forming system 300 includes print bars 302 which may each be slidably mounted on a frame positioned at a fixed height above the surface of the blanket 102 and include a strip of print heads with individually controllable print nozzles through which the ink is ejected to form the desired pattern. The image forming system can have any number of bars 302, each of which may contain an ink of a different or of the same color, typically each jetting Cyan (C), Magenta (M), Yellow (Y) or Black (K) inks. It is possible for the print bars to deposit different shades of the same color (e.g., various shades of gray, including black) or customized mix of colors (e.g., brand colors) or for two print bars or more to deposit the same color (e.g., black). Additionally, the print bar can be used for pigmentless liquids (e.g., decorative or protective varnishes) and/or for specialty inks (e.g., achieving visual effect, such as metallic, sparkling, glowing or glittering look, or even scented effect).

Within each print bar, the ink may be constantly recirculated, filtered, degassed and maintained at a desired temperature and pressure, as known to the person skilled in the art without the need for more detailed description. As different print bars 302 are spaced from one another along the length of the blanket, it is of course essential for their operation to be correctly synchronized with the movement of blanket 102. It is important for the blanket 102 to move with constant speed through the image forming station 300, as any hesitation or vibration will affect the registration of the ink droplets of different colors.

If desired, it is possible to provide a blower 304 following each print bar 302 to blow a slow stream of a hot gas, preferably air, over the intermediate transfer member to commence the drying of the ink droplets deposited by the print bar 302. This assists in fixing the droplets deposited by each print bar 302, that is to say resisting their contraction and preventing their movement on the intermediate transfer member, and also in preventing them from merging into droplets deposited subsequently by other print bars 302. Such post jetting treatment of the just deposited ink droplets, need not substantially dry them, but only enable the formation of a skin on their outer surface.

The image forming station illustrated in FIG. 2A comprises optional rollers 132 to assist in guiding the blanket smoothly adjacent each printing bar 302. The rollers 132 need not be precisely aligned with their respective print bars and may be located slightly (e.g., few millimeters) downstream or upstream of the print head jetting location. The frictional forces can maintain the belt taut and substantially parallel to the print bars. The underside of the blanket may therefore have high frictional properties as it is only ever in rolling contact with all the surfaces on which it is guided.

Following deposition of the desired ink image by the image forming system 300 on an upper run of the ITM, the image is dried by a drying system 400 described below in more details. A lower run of the blanket then selectively interacts at an impression station where the transfer member can be compressed to an impression cylinder to impress the dried image from the blanket onto a printing substrate. FIG. 1A shows two impression stations with two impression cylinders 502 and 504 of the substrate transport system 500 and two respectively aligned pressure or nip rollers 142, 144, which can be raised and lowered from the lower run of the blanket. When an impression cylinder and its corresponding pressure roller are both engaged with the blanket passing there-between, they form an impression station 550. The presence of two impression stations, as shown in FIG. 1A, is to permit duplex printing. In this figure, the perfecting of the substrate is implemented by a perfecting cylinder 524 situated in between two transport rollers 522 and 526 which respectively transfer the substrate from the first impression cylinder 502 to the perfecting cylinder 524 and therefrom on its reverse side to the second impression cylinder 504. Though not illustrated, duplex printing can also be achieved with a single impression station using an adapted perfecting system able to refeed to the impression station on the reverse side a substrate already printed on its first side. In the case of a simplex printer, only one impression station would be needed and a perfecting system would be superfluous. Perfecting systems are known in the art of printing and need not be detailed.

FIG. 2A illustrates an alternative printing system suitable for a "thin belt" looped blanket which is compressed during engagement with the impression cylinder 506 by a pressure roller 146 which to achieve intimate contact between the release layer of the ITM and the substrate comprises the compressible layer substantially absent from the body of the transfer member. The compressible layer of the pressure roller 146 typically has the form of a replaceable compressible blanket 148. Such compressible layer or blanket is releasably clamped or attached onto the outer surface of the pressure cylinder 146 and provides the conformability required to urge the release layer of the blanket 102 into contact with the substrate sheets 501. Rollers 108 and 114 on each side of the impression station, or any other two rollers spanning this station closer to the nip (not shown), ensure that the belt is maintained in a desired orientation as it passes through the nip between the cylinders 146 and 506 of the impression station 550.

In this system, both the impression cylinder 506 and the pressure roller 146 bearing a compressible layer or blanket 148 can have as cross section in the plane of rotation a partly truncated circular shape. In the case of the pressure roller, there is a discontinuity where the ends of the compressible layer are secured to the cylinder on which it is supported. In the case of the impression cylinder, there can also be a discontinuity to accommodate grippers serving to hold the sheets of substrate in position against the impression cylinder. The impression cylinder and pressure roller of impression station 550 rotate in synchronism so that the two discontinuities line up during cycles forming periodically an enlarged gap at which time the blanket can be totally disengaged from any of these cylinders and thus be displaced in suitable directions to achieve any desired alignment or at suitable speed that would locally differ from the speed of the blanket at the image forming station. This can be achieved by providing powered tensioning rollers or dancers 112 and 114 on opposite sides of the nip between the pressure and impression cylinders. Although roller 114 is illustrated in FIG. 2A as being in contact with the inner/underneath side of the blanket, alignment can similarly be achieved if it were positioned facing the release layer. This alternative, as well as additional optional rollers positioned to assist the dancers in their function, are not shown. The speed differential will result in slack building up on one side or the other of the nip between the pressure and impression cylinders and the dancers can act at times when there is an enlarged gap between the pressure and impression cylinders 146 and 506 to advance or retard the phase of the belt, by reducing the slack on one side of the nip and increasing it on the other.

Independently of the number of impression stations, their configuration, the layer structure of the ITM and the presence or absence of a perfecting mechanism in such printing systems, in operation, ink images, each of which is a mirror image of an image to be impressed on a final substrate, are printed by the image forming system 300 onto an upper run of blanket 102. While being transported by the blanket 102, the ink is heated to dry it by evaporation of most, if not all, of the liquid carrier. The carrier evaporation may start at the image forming station 300 and be pursued and/or completed at a drying station 400 able to substantially dry the ink droplets to form a residue film of ink solids remaining after evaporation of the liquid carrier. The residue film image is considered substantially dry or the image dried if any residual carrier they may contain does not hamper transfer to the printing substrate and does not wet the printing substrate. The dried ink image can be further heated to render tacky the film of ink solids before being transferred to the substrate at an impression station. Such optional pre-transfer heater 410 is shown in FIG. 2A.

FIGS. 1A and 2A depict the image being impressed onto individual sheets 501 of a substrate which are conveyed by the substrate transport system 500 from an input stack 516 to an output stack 518 via the impression cylinders 502, 504 or 506. Though not shown in the figures, the substrate may be a continuous web, in which case the input and output stacks are replaced by a supply roller and a delivery roller. The substrate transport system needs to be adapted accordingly, for instance by using guide rollers and dancers taking slacks of web to properly align it with the impression station.

The Drying System

Printing systems wherein the present invention may be practiced can comprise a drying system 400. As noted any drying system able to evaporate the ink carrier out of the ink image deposited at the image forming station 300 to substantially dry it by the time the image enters the impression station is suitable. Such system can be formed from one or more individual drying elements typically disposed above the blanket along its path. The drying element can be radiant heaters (e.g., IR or UV) or convection heaters (e.g., air blowers) or any other mean known to the person of skill in the art. The settings of such a system can be adjusted according to parameters known to professional printers, such factors including for instance the type of the inks and of the transfer member, the ink coverage, the length/area of the transfer member being subject to the drying, the printing speed, the presence/effect of a pre-transfer heater etc.

Operating Temperatures

Each station of such printing systems may be operated at same or different temperatures. The operating temperatures are typically selected to provide the optimal temperature suitable to achieve the purported goal of the specific station, preferably without negatively affecting the process at other steps. Therefore as well as providing heating means along the path of the blanket, it is possible to provide means for cooling it, for example by blowing cold air or applying a cooling liquid onto its surface. In printing systems in which a treatment or conditioning fluid is applied to the surface of the blanket, the treatment station may serve as a cooling station.

The temperature at various stage of the process may also vary depending on the exact composition of the ITM, the inks and the conditioning fluid, if needed, being used and may even fluctuate at various locations along a given station. In some embodiments, the temperature on the outer surface of the ITM at the image forming station is in a range between 40° C. and 160° C., or between 60° C. and 90° C. In some embodiments, the temperature at the drying station is in a range between 90° C. and 300° C., or between 150° C. and 250° C., or between 180° C. and 225° C. In some embodiments, the temperature at the impression station is in a range between 80° C. and 220° C., or between 100° C. and 160° C., or of about 120° C., or of about 150° C. If a cooling station is desired to allow the ITM to enter the image forming station at a temperature that would be compatible to the operative range of such station, the cooling temperature may be in a range between 40° C. and 90° C.

As mentioned, the temperature of the transfer member may be raised by heating means positioned externally to the blanket support system, as illustrated by any of heaters 304, 400 and 410, when present in the printing system. Alternatively and additionally, the transfer member may be heated from within the support system. Such an option is illustrated by heating plates 130 of FIG. 1A. Though not shown, any of the guiding rollers conveying the looped blanket may also comprise internal heating elements.

Blanket and Blanket Support System

The ITM can be a belt formed of an initially flat elongate blanket strip of which the ends can be releasably fastened or permanently secured to one another to form a continuous loop. A releasable fastening for blanket 102 may be a zip fastener or a hook and loop fastener that lies substantially parallel to the axes of rollers 104 and 106 over which the blanket is guided. A zip fastener, for instance, allow easy installation and replacement of the belt. A permanent securing may be achieved by soldering, welding, adhering, and taping the ends of the blanket to one another. Independently of the mean elected to releasably or permanently secure these ends to form a continuous flexible belt, the secured ends, which cause a discontinuity in the transfer member, are said to form a seam. The continuous belt may be formed by more than one elongated blanket strip and may therefore include more than one seam.

In order to avoid a sudden change in the tension of the belt as the seam passes over rollers or other parts of the support system, it is desirable to make the seam, as nearly as possible, of the same thickness as the remainder of the blanket. It is desirable to avoid an increase in the thickness or discontinuity of chemical and/or mechanical properties of the belt at the seam. Preferably, no ink image or part thereof is deposited on the seam, but only as close as feasible to such discontinuity on an area of the belt having substantially uniform properties/characteristics. Desirably, the seam passes impression stations at a time their impression rollers are not engaged with their corresponding pressure rollers. Alternatively, the belt may be seamless.

Blanket Lateral Guidance

In some instances, the blanket support system further includes a continuous track that can engage formations on the side edges of the blanket to maintain the blanket taut in its width ways direction. The formations may be spaced projections, such as the teeth of one half of a zip fastener sewn or otherwise attached to each side edge of the blanket. Such lateral formations need not be regularly spaced. Alternatively, the formations may be a continuous flexible bead of greater thickness than the blanket. The lateral formations may be directly attached to the edges of the blanket or through an intermediate strip that can optionally provide suitable elasticity to engage the formations in their respective guiding track, while maintaining the blanket flat in particular at the image forming station. The lateral track guide channel may have any cross-section suitable to receive and retain the blanket lateral formations and maintain it taut. To reduce friction, the guide channel may have rolling bearing elements to retain the projections or the beads within the channel.

The lateral formations may be made of any material able to sustain the operating conditions of the printing system, including the rapid motion of the blanket. Suitable materials can resist elevated temperatures in the range of about 50° C. to 250° C. Advantageously, such materials are also friction resistant and do not yield debris of size and/or amount that would negatively affect the movement of the belt during its operative lifespan. For example, the lateral projections can be made of polyamide reinforced with molybdenum disulfide.

As the lateral guide channels ensure accurate placement of the ink droplets on the blanket, their presence is particularly advantageous at the image forming station 300. In other areas, such as within the drying station 400 and an impression station 550, lateral guide channels may be desirable but less important. In regions where the blanket has slack, no guide channels are present. Further details on exemplary blanket lateral formations or seams that may be suitable for intermediate transfer members according to the present invention are disclosed in PCT Publication No. WO 2013/136220.

Such lateral formations and corresponding guide channels are typically not necessary when the intermediate transfer member is mounted on a rigid support.

The ends of the blanket strip are advantageously shaped to facilitate guiding of the belt through the lateral channels and over the rollers during installation. Initial guiding of the belt into position may be done for instance by securing the leading edge of the belt strip introduced first in between the lateral channels to a cable which can be manually or automatically moved to install the belt. For example, one or both lateral ends of the belt leading edge can be releasably attached to a cable residing within each channel. Advancing the cable(s) advances the belt along the channel path. Alternatively or additionally, the edge of the belt in the area ultimately forming the seam when both edges are secured one to the other can have lower flexibility than in the areas other than the seam. This local "rigidity" may ease the insertion of the lateral formations of the belt strip into their respective channels.

The blanket support system may comprise various additional optional subsystems.

Blanket Conditioning Station

In some printing systems, the intermediate transfer member may be optionally treated to further increase the interaction of the compatible ink with the ITM, or further facilitate the release of the dried ink image to the substrate, or provide for a desired printing effect. The treating station may apply a physical treatment or a chemical treatment. In some cases, the ITM is treated with a chemical agent also termed conditioning agent. The compositions being applied to the intermediate transfer member are often referred to as treatment solutions or conditioning fluids and the station at which such treatment may take place is referred to as a conditioning station. This station is typically located upstream the image forming station and the treatment is applied before an ink image is jetted.

Such a station is schematically illustrated in FIG. 1A as roller 190 positioned on the external side of the blanket adjacent to roller 106 and in FIG. 2A as applicator 192. Such a roller 190 or applicator 192 may be used to apply a thin even film of treatment solution containing a conditioning chemical agent. The conditioning fluid can alternatively be sprayed onto the surface of the blanket and optionally spread more evenly, for example by the application of a jet from an air knife. Alternatively, the conditioning solution may be applied by passing the blanket over a thin film of conditioning solution seeping through a cloth having no direct contact with the surface of the release layer. Surplus of treatment solution, if any, can be removed by air knife, scrapper, squeegee rollers or any suitable manner. As the film of conditioning solution being applied is typically very thin, the blanket surface is substantially dry upon entry through the image forming station. Typically, when needed, the conditioning solution is applied with every cycle of the belt. Alternatively, it may be applied periodically at intervals of suitable number of cycles.

Blanket Cleaning Station

Though not shown in the figures, the blanket system may further comprise a cleaning station which may be used to gently remove any residual ink images or any other trace particle from the release layer. Such cleaning step may for instance be applied in between printing jobs to periodically "refresh" the belt. The cleaning station may comprise one or more devices each individually configured to remove same or different types of undesired residues from the surface of the release layer. In one embodiment, the cleaning station may comprise a device configured to apply a cleaning fluid to the surface of the transfer member, for example a roller having cleaning liquid on its circumference, which preferably should be replaceable (e.g., a pad or piece of paper). Residual particles may optionally be further removed by an absorbent roller or by one or more scraper blades.

The Control Systems

The above descriptions are simplified and provided only for the purpose of enabling an understanding of exemplary printing systems and processes with which the presently claimed invention may be used. In order for the image to be properly formed on the blanket and transferred to the final substrate and for the alignment of the front and back images in duplex printing to be achieved, a number of different elements of the system must be properly synchronized. In order to position the images on the blanket properly, the position and speed of the blanket must be both known and controlled. For this purpose, the blanket can be marked at or near its edge with one or more markings spaced in the direction of motion of the blanket. One or more sensors can be located in the printing system along the path of the blanket to sense the timing of these markings as they pass the sensor. Signals from the sensor(s) can be sent to a controller which may also receive an indication of the speed of rotation and angular position of any of the rollers conveying the blanket, for example from encoders on the axis of one or both of the impression rollers. The sensor(s) may also determine the time at which the seam of the blanket passes the sensor. For maximum utility of the usable length of the blanket, it is desirable that the images on the blanket start as close to the seam as feasible. For a successful printing system, the control of the various stations of the printing system is important but need not be considered in detail in the present context. Exemplary control systems that may be suitable for printing systems in which the present invention can be practiced are disclosed in PCT Publication No. WO 2013/132424.

A method of digital printing by a printing system configured to convert digital input images into ink images by droplet deposition onto a target surface is disclosed. The printing system comprises a multi-nozzle and multi-head print bar that defines print and cross-print directions. The method comprises a. performing a calibration by: i. printing on the target surface a digital input-calibration-image DICI by the print-bar of the printing system so as to generate an ink calibration-image; ii. optically imaging the ink calibration-image to obtain a digital output-calibration-image DOCI; iii. computing from the digital output-calibration-image DOCI a representative print-bar tone-reproduction-function trf(bar) for the entire print bar; iv. for each slice $slice_i(DOCI)$ of a plurality $\{slice_1(DOCI), slice_2(DOCI) \ldots slice_N(DOCI)\}$ of slices of the digital output-calibration-image DOCI, computing a respective slice-specific tone-reproduction-function $trf(slice_i(DOCI))$; and v. for each of slice $slice_i(DOCI)$ of the slice-plurality, applying a respective inverse of a respective slice-specific tone-reproduction-function to the representative print-bar tone-reproduction-function trf(bar) to yield a tone-shift-function-set $tsfs(DOCI)=\{tsf\_slice_1(DOCI)(tone-value), tsf\_slice_2(DOCI)(tone-value), \ldots tsf\_slice_N(DOCI)(tone-value)\}$ of slice-specific tone-shift functions; and vi. deriving a print-bar-spanning image-correction-function ICF (cross-print-direction-location, tone-value) from the tone-shift-function-set tsfs(DOCI) of slice-specific tone-shift functions; b. applying the image-correction-function ICF to a uncorrected digital image UDI so as to compute a corrected digital image CDI; and c. printing the corrected digital image CDI by the printing system.

A method of digital printing by a printing system configured to convert digital input images into ink images by droplet deposition onto a target surface is disclosed. The printing system comprises a multi-nozzle and multi-head print bar that defines print and cross-print directions. The method comprises a. performing a calibration by: i. printing on the target surface a digital input-calibration-image DICI by the print-bar of the printing system so as to generate an ink calibration-image; ii. optically imaging the ink calibration-image to obtain a digital output-calibration-image DOCI; iii. computing from the digital output-calibration-image DOCI a representative print-bar tone-reproduction-function trf(bar) for the entire print bar; iv. for each slice $slice_i(DOCI)$ of a plurality $\{slice_1(DOCI), slice_2(DOCI) \ldots slice_N(DOCI)\}$ of slices of the digital output-calibration-image DOCI, computing a respective slice-specific tone-reproduction-function $trf(slice_i(DOCI))$; and v. deriving a print-bar-spanning image-correction-function ICF (cross-print-direction-location, tone-value) from the slice-specific and/or print-bar tone reproduction function(s); b. applying the image-correction-function ICF to a uncorrected digital image UDI so as to compute a corrected digital image CDI; and c. printing the corrected digital image CDI by the printing system.

In some embodiments, i. the printing system is configured so that images produced by the print-bar thereof are dividable into alternating single-print-head slices and interlace slices; ii. within the single-print-head slices, the ICF is derived primarily from region-internal DOCI data; and iii. within the interlace slices, the ICF is derived primarily from extrapolation of region external DOCI data.

In some embodiments, i. the printing system is configured so that images produced by the print-bar thereof comprise first and second distinct single-print-head slices and a mediating slice therebetween, the first and second single-print-head slices being respectively exclusive for first and second print-heads; ii. the mediating slice includes first and second sets of positions interlaced therein, positions of the first and second set respectively corresponding to nozzle positions for nozzles of the first and second print heads; iii. the deriving of the ICF includes computing first and second extrapolation functions respectively describing extrapolation from the first and second single-print-head slices into the mediating region of DOCI data, or a derivative thereof; and iv. within the mediating region, (A) at positions of the first set, the ICF is derived primarily from the first extrapolation function and (B) at positions of the second set, the ICF is derived primarily from the second extrapolation function.

In some embodiments, i. the printing system is configured so that images produced by the print-bar thereof comprise first and second of distinct single-print-head slices and a interlace slice therebetween, the first and second single-print-head slices being respectively exclusive for first and second print-heads; ii. the interlace slice includes first and second sets of positions interlaced therein, positions of the first and second set respectively corresponding to nozzle positions for nozzles of the first and second print heads; and iii. within the interlace region, the ICF is computed by determining if a position in the mediating region corresponds to a nozzle position of the first print-head or the second print-head, and the ICF is computed according to the results of the determining.

In some embodiments, i. the printing system is configured so that images produced by the print-bar thereof comprise first and second of distinct single-print-head slices and a mediating slice therebetween, the first and second single-print-head slices being respectively exclusive for first and second print-heads; ii. the mediating region includes first $P_1$ and second $P_2$ positions, the first position $P_1$ being closer to the first single-print-head slice than the second $P_2$ position is to the first single-print-head slice, the second position $P_2$ being closer to the second single-print-head slice than the first position $P_1$ is to the second single-print-head slice; iii. the deriving of the ICF includes computing first and second extrapolation functions respectively describing extrapolation from the first and second single-print-head slices into the mediating region of DOCI data, or a derivative thereof; and iv. when computing ICF for the first position, a greater weight is assigned to the second extrapolation function than to the first extrapolation function; and v. when computing ICF for the second position, a greater weight is assigned to the first extrapolation function than to the second extrapolation function.

In some embodiments, the target surface is a surface of an intermediate transfer member (ITM) of the printing system and the ink images formed on the ITM surface by the droplet deposition are subsequently transferred from the ITM to a printing substrate.

In some embodiments, the ITM is a drum.

In some embodiments, the ITM is a belt.

In some embodiments, the ink and/or target surface may provide any feature or combination of features disclosed in any of the following published patent applications, each of which are incorporated herein by reference in its entirety: WO 2013/132439; WO 2013/132432; WO 2013/132438; WO 2013/132339; WO 2013/132343; WO 2013/132345; and WO 2013/132340.

In some embodiments, the calibration image comprises a plurality of stripes, each having a uniform tone value.

In some embodiments, the stripes of the calibration image having same tone value span the entire print-bar.

In some embodiments, the digital input-calibration-image or portions thereof is printed on a single target surface.

In some embodiments, the digital input-calibration-image or portions thereof is printed on two or more different target surfaces.

In some embodiments, the calibration is performed off-line. In such embodiments, the target surface consists of the calibration image or portions thereof that may be subsequently combined.

In some embodiments, the calibration is performed on-line. In such embodiments, the target surface consists of a desired image and of the calibration image or portions thereof. In particular embodiments, the calibration image, or portions thereof that may be subsequently combined, is printed on two or more different target surfaces. In such embodiments, the calibration image or portions thereof can be printed on areas of the target surface not overlapping the desired image (e.g., in margins).

In some embodiments, the printing system comprises a plurality of print bars, each said print-bar depositing an ink having same or different color, the calibration being performed separately for each ink having a different color and/or for each print bar.

In some embodiments, the calibration is performed sequentially more than once to further refine the computing of the corrected digital image CDI—for example, after affecting a first correction the results may be analyzed and, if appropriate, an additional correction may be performed.

In some embodiments, the calibration is sequentially performed by sequences of any of off-line and on-line calibration stages that may be the same or different. For instance, the sequences of calibration can be off-line and off-line calibration, off-line and on-line calibration, on-line and off-line calibration, on-line and on-line calibration, and further combinations. Such multiple calibrations need not be immediately sequential, the "sequence" being "interrupted" by the printing of desired images on the target surfaces, such printing being devoid of calibration.

In some embodiments, the droplet deposition is by ink jetting.

In some embodiments, the ink images are deposited at a resolution between 100 dpi and 2000 dpi.

In some embodiments, the width of a slice of any slice disclosed herein (e.g., a single-, or a single-print-head, or a 'mediating', or an 'interlace slice') is no less than 5 pixels, or is no less than 10 pixels, or no less than 20 pixels, or no less than 40 pixels, or no less than 60 pixels, or no less than 100 pixels. In some embodiments, the target surface is a surface of an intermediate transfer member (ITM) (e.g., a drum or belt) of the printing system and the ink images formed on the ITM surface by the droplet deposition are subsequently transferred from the ITM to a printing substrate.

In some embodiments, the ink images are deposited on a target surface being a printing substrate (e.g., selected from fibrous and non fibrous, coated and uncoated, flexible and rigid, sheets and webs delivered substrate of paper, cardboard, plastic and additional suitable material).

In some embodiments, the calibration is done upon installation or change of one or more print-heads within a print-bar.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the present disclosure has been described with respect to various specific embodiments presented thereof for the sake of illustration only, such specifically disclosed embodiments should not be considered limiting. Many other alternatives, modifications and variations of such embodiments will occur to those skilled in the art based upon Applicant's disclosure herein. Accordingly, it is intended to embrace all such alternatives, modifications and variations and to be bound only by the spirit and scope of the appended claims and any change which come within their meaning and range of equivalency.

In the description and claims of the present disclosure, each of the verbs "comprise", "include" and "have", and conjugates thereof, are used to indicate that the object or objects of the verb are not necessarily a complete listing of features, members, steps, components, elements or parts of the subject or subjects of the verb.

As used herein, the singular form "a", "an" and "the" include plural references and mean "at least one" or "one or more" unless the context clearly dictates otherwise.

Unless otherwise stated, the use of the expression "and/or" between the last two members of a list of options for selection indicates that a selection of one or more of the listed options is appropriate and may be made.

Unless otherwise stated, adjectives such as "substantially" and "about" that modify a condition or relationship characteristic of a feature or features of an embodiment of the present technology, are to be understood to mean that the condition or characteristic is defined to within tolerances that are acceptable for operation of the embodiment for an application for which it is intended.

To the extent necessary to understand or complete the present disclosure, all publications, patents, and patent applications mentioned herein, including in particular the applications of the Applicant, are expressly incorporated by reference in their entirety by reference as is fully set forth herein.

The invention claimed is:

1. A method of digital printing by printing apparatus configured to convert digital input images into ink images by droplet deposition onto a target surface, the printing apparatus comprising a multi-nozzle and multi-head print bar that defines print and cross-print directions, the method comprising:
  a. performing a calibration by:
    i. printing on the target surface a digital input-calibration-image DICI by the print-bar of the printing apparatus so as to generate an ink calibration-image;
    ii. optically imaging the ink calibration-image to obtain a digital output-calibration-image DOCI;
    iii. computing from the digital output-calibration-image DOCI a representative print-bar tone-reproduction-function trf(bar) for the entire print bar;
    iv. for each slice $slice_i(DOCI)$ of a plurality $\{slice_1(DOCI), slice_2(DOCI) \ldots slice_N(DOCI)\}$ of slices of the digital output-calibration-image DOCI, computing a different respective slice-specific tone-reproduction-function $trf(slice_i(DOCI))$; and
    v. for each of slice $slice_i(DOCI)$ of the slice-plurality, applying a respective inverse of a respective slice-specific tone-reproduction-function to the representative print-bar tone-reproduction-function trf(bar) to yield a tone-shift-function-set tsfs(DOCI)=$\{tsf\_slice_i(DOCI)(tone-value), tsf\_slice_2(DOCI)(tone-value), \ldots tsf\_slice_N(DOCI)(tone-value)\}$ of slice-specific tone-shift functions; and
    vi. deriving a print-bar-spanning image-correction-function ICF (cross-print-direction-location, tone-value) from the tone-shift-function-set tsfs(DOCI) of slice-specific tone-shift functions;
  b. applying the image-correction-function ICF to a uncorrected digital image UDI so as to compute a corrected digital image CDI; and
  c. printing the corrected digital image CDI by the printing apparatus.

2. The method of claim 1, wherein:
  i. the printing apparatus is configured so that images produced by the print-bar thereof are dividable into alternating single-print-head slices and interlace slices;
  ii. within the single-print-head slices, the ICF is derived primarily from region-internal DOCI data; and
  iii. within the interlace slices, the ICF is derived primarily from extrapolation of region external DOCI data.

3. The method of claim 1, wherein the target surface is a surface of an intermediate transfer member (ITM) of the printing apparatus and the ink images formed on the ITM surface by the droplet deposition are subsequently transferred from the ITM to a printing substrate.

4. A method of digital printing by a printing apparatus that (i) comprises a multi-nozzle and multi-head print bar that defines print and cross-print directions and (ii) is configured to convert digital input images into ink images by droplet deposition onto a target surface, the method comprising:
  a. performing a calibration by:
    i. printing on the target surface a digital input-calibration-image DICI by the print-bar of the printing apparatus so as to generate an ink calibration-image;
    ii. optically imaging the ink calibration-image to obtain a digital output-calibration-image DOCI;
    iii. computing from the digital output-calibration-image DOCI a representative print-bar tone-reproduction-function trf(bar) for the entire print bar;
    iv. for each slice $slice_i(DOCI)$ of a plurality $\{slice_1(DOCI), slice_2(DOCI) \ldots slice_N(DOCI)\}$ of slices of the digital output-calibration-image DOCI, computing a different respective slice-specific tone-reproduction-function $trf(slice_i(DOCI))$; and
    v. deriving a print-bar-spanning image-correction-function ICF (cross-print-direction-location, tone-value) from the combination of (A) the slice-specific tone reproduction function(s) and (B) the print-bar tone reproduction function;
  b. applying the image-correction-function ICF to a uncorrected digital image UDI so as to compute a corrected digital image CDI; and
  c. printing the corrected digital image CDI by the printing apparatus,
  wherein: A. the printing apparatus is configured so that images produced by the print-bar thereof comprise first and second distinct single-print-head slices and a mediating slice therebetween, the first and second single-print-head slices being respectively exclusive for first and second print-heads of the multi-head print bar; B. the mediating slice includes first and second sets of positions interlaced therein, positions of the first and second set respectively corresponding to nozzle positions for nozzles of the first and second print heads; C. the deriving of the ICF includes computing first and second extrapolation functions respectively describing extrapolation from the first and second single-print-head slices into the mediating region of DOCI data, or a derivative there, the first and second extrapolation functions being different from each other; and iv. within the mediating region, (A) at positions of the first set, the ICF is derived primarily from the first extrapolation function and (B) at positions of the second set, the ICF is derived primarily from the second extrapolation function.

5. A method of digital printing by a printing apparatus that (i) comprises a multi-nozzle and multi-head print bar that defines print and cross-print directions and (ii) is configured to convert digital input images into ink images by droplet deposition onto a target surface, the method comprising:
  a. performing a calibration by:
    i. printing on the target surface a digital input-calibration-image DICI by the print-bar of the printing apparatus so as to generate an ink calibration-image;
    ii. optically imaging the ink calibration-image to obtain a digital output-calibration-image DOCI;
    iii. computing from the digital output-calibration-image DOCI a representative print-bar tone-reproduction-function trf(bar) for the entire print bar; iv. for each slice $slice_i(DOCI)$ of a plurality $\{slice_1(DOCI), slice_2(DOCI) \ldots slice_N(DOCI)\}$ of slices of the digital output-calibration-image DOCI, computing a different respective slice-specific tone-reproduction-function $trf(slice_i(DOCI))$; and
    v. deriving a print-bar-spanning image-correction-function ICF (cross-print-direction-location, tone-value) from the combination of (A) the slice-specific tone reproduction function(s) and (B) the print-bar tone reproduction function;
  b. applying the image-correction-function ICF to a uncorrected digital image UDI so as to compute a corrected digital image CDI; and
  c. printing the corrected digital image CDI by the printing apparatus, wherein A. the printing apparatus is configured so that images produced by the print-bar thereof comprise first and second of distinct single-print-head slices and a interlace slice therebetween, the first and second single-print-head slices being respectively exclusive for first and second print-heads; B. the interlace slice includes first and second sets of positions interlaced therein, positions of the first and second set respectively corresponding to nozzle positions for nozzles of the first and second print heads; and C. within the interlace region, the ICF is computed by determining if a position in the mediating region corresponds to a nozzle position of the first print-head or the second print-head, and the ICF is computed according to the results of the determining.

6. A method of digital printing by a printing apparatus that (i) comprises a multi-nozzle and multi-head print bar that defines print and cross-print directions and (ii) is configured to convert digital input images into ink images by droplet deposition onto a target surface, the method comprising:

a. performing a calibration by:
      i. printing on the target surface a digital input-calibration-image DICI by the print-bar of the printing apparatus so as to generate an ink calibration-image;
      ii. optically imaging the ink calibration-image to obtain a digital output-calibration-image DOCI;
      iii. computing from the digital output-calibration-image DOCI a representative print-bar tone-reproduction-function trf(bar) for the entire print bar;
      iv. for each slice $slice_i(DOCI)$ of a plurality $\{slice_1(DOCI), slice_2(DOCI) \ldots slice_N(DOCI)\}$ of slices of the digital output-calibration-image DOCI, computing a different respective slice-specific tone-reproduction-function $trf(slice_i(DOCI))$; and
      v. deriving a print-bar-spanning image-correction-function ICF (cross-print-direction-location, tone-value) from the combination of (A) the slice-specific tone reproduction function(s) and (B) the print-bar tone reproduction function;
   b. applying the image-correction-function ICF to a uncorrected digital image UDI so as to compute a corrected digital image CDI; and
   c. printing the corrected digital image CDI by the printing apparatus, wherein: A. the printing apparatus is configured so that images produced by the print-bar thereof comprise first and second of distinct single-print-head slices and a mediating slice therebetween, the first and second single-print-head slices being respectively exclusive for first and second print-heads; B. the mediating region includes first $P_1$ and second $P_2$ positions, the first position $P_1$ being closer to the first single-print-head slice than the second $P_2$ position is to the first single-print-head slice, the second position $P_2$ being closer to the second single-print-head slice than the first position $P_1$ is to the second single-print-head slice; C. the deriving of the ICF includes computing first and second extrapolation functions respectively describing extrapolation from the first and second single-print-head slices into the mediating region of DOCI data, or a derivative thereof, the first and second extrapolation functions being different from each other; and D. when computing ICF for the first position, a greater weight is assigned to the second extrapolation function than to the first extrapolation function; and v. when computing ICF for the second position, a greater weight is assigned to the first extrapolation function than to the second extrapolation function.

* * * * *